(12) United States Patent
Chester et al.

(10) Patent No.: US 11,144,587 B2
(45) Date of Patent: Oct. 12, 2021

(54) USER DRAWING BASED IMAGE SEARCH

(71) Applicant: SHUTTERSTOCK, INC., New York, NY (US)

(72) Inventors: David Chester, Brooklyn, NY (US); Nathan Hurst, Seattle, WA (US)

(73) Assignee: Shutterstock, Inc., New York, NY (US)

( * ) Notice: Subject to any disclaimer, the term of this patent is extended or adjusted under 35 U.S.C. 154(b) by 596 days.

(21) Appl. No.: 15/064,522

(22) Filed: Mar. 8, 2016

(65) Prior Publication Data
US 2017/0262479 A1    Sep. 14, 2017

(51) Int. Cl.
*G06F 16/532* (2019.01)
*G06F 16/54* (2019.01)
*G06F 16/56* (2019.01)
*G06F 16/583* (2019.01)

(52) U.S. Cl.
CPC ........... *G06F 16/532* (2019.01); *G06F 16/54* (2019.01); *G06F 16/56* (2019.01); *G06F 16/583* (2019.01); *G06F 16/5838* (2019.01)

(58) Field of Classification Search
CPC ......... G06F 17/30244; G06F 17/30256; G06F 16/532; G06F 16/5838; G06F 16/583; G06F 16/54; G06F 16/56
See application file for complete search history.

(56) References Cited

U.S. PATENT DOCUMENTS

| | | | | |
|---|---|---|---|---|
| 5,842,194 A | * | 11/1998 | Arbuckle | G06K 9/6857 706/52 |
| 2012/0005222 A1 | * | 1/2012 | Bhagwan | G06F 17/30389 707/769 |
| 2014/0328540 A1 | * | 11/2014 | Wang | G06K 9/00476 382/173 |
| 2016/0092784 A1 | * | 3/2016 | Bala | G06N 99/005 706/12 |

(Continued)

OTHER PUBLICATIONS

Abhinav Shrivastava, et al., "Data-Driven Visual Similarity for Cross-Domain Image Matching," ACM Transactions on Graphics (TOG)—Proceedings of ACM SIGGRAPH Asia 2011, vol. 30, Issue 6, Dec. 2011.

*Primary Examiner* — Vaishali Shah
(74) *Attorney, Agent, or Firm* — McDermott Will & Emery LLP

(57) ABSTRACT

Various aspects of the subject technology relate to systems, methods, and machine-readable media for user drawing based image search. These aspects include an image retrieval system using a convolutional neural network trained to identify how users draw semantic concepts and using an image search engine to search against images having a similar concept. The aspects include mapping between concepts of the user drawing space and concepts of the image space such that images associated with the same concept are identified. For each input user drawing, the drawing is first processed through a concept classifier to identify a corresponding concept, and then through a feature (Continued)

extractor to form a corresponding feature vector. The results from the concept classifier and the feature extractor may be combined to search against a collection of images having a similar concept to determine a listing of images ranked by visual and semantic similarity to the input.

18 Claims, 13 Drawing Sheets

(56) References Cited

U.S. PATENT DOCUMENTS

| | | | |
|---|---|---|---|
| 2016/0196350 A1* | 7/2016 | Mau | G06F 17/30256 |
| | | | 707/706 |
| 2016/0364625 A1* | 12/2016 | Lin | G06T 7/90 |
| 2016/0371775 A1* | 12/2016 | Sandow | G06Q 40/04 |
| 2017/0083599 A1* | 3/2017 | Bostick | G06F 17/30598 |
| 2017/0090713 A1* | 3/2017 | Becker | G06F 3/0488 |
| 2017/0344822 A1* | 11/2017 | Popescu | G06K 9/62 |
| 2018/0018349 A1* | 1/2018 | Liu | G06F 17/2785 |
| 2019/0012716 A1* | 1/2019 | Murakami | G06K 9/00422 |

* cited by examiner

USER DRAWING BASED IMAGE SEARCH

BACKGROUND

Field

The present disclosure generally relates to a computer-based neural network for image retrieval, and more particularly to user drawing based image search.

Description of the Related Art

Users commonly search for content, such as image content items, and use the image content items they find to produce a creative illustration. Such users can search for image content items through a search interface for a media collection. Standard approaches for searching for image content items include text-based image search and upload-based image search. In the text-based approach, an image search initiates a search relying upon keywords parsed from a text-based user query. In the upload-based approach, an image search initiates a search for content that closely resembles an image uploaded by a user. However, image searches using text-based queries and/or uploaded images may not accurately reflect a user's desired content at the time of the search.

SUMMARY

According to one embodiment of the present disclosure, a computer-implemented method is provided for receiving user input identifying a representation of a user drawing, the user drawing representing a search query for initiating an image search; determining a concept of the user drawing, the concept indicating semantic subject matter in the representation of the user drawing; determining a collection of images that is relevant to the determined concept; comparing feature vectors of images in the collection of images to a feature vector of the user drawing; and generating search results associated with the image search based on comparison results of the comparison between the feature vector of the user drawing and the feature vectors of the images.

In certain aspects, the method further includes detecting a first sequence of user inputs identifying a first portion of the user drawing, the first sequence of user inputs comprising a plurality of pixel coordinates corresponding to a two-dimensional representation of a first drawing stroke. In these aspects, the concept is determined in response to the detection of the first sequence of user inputs. In these aspects, the method includes detecting a second sequence of user inputs identifying a second portion of the user drawing, the second sequence of user inputs being detected subsequent to the first sequence of user inputs, the second sequence of user inputs comprising a second plurality of pixel coordinates corresponding to a two-dimensional representation of a second drawing stroke. In these aspects, the concept determined based on the first sequence of user inputs is changed to a new concept in response to the detection of the second sequence of user inputs. In these aspects, the concept is determined based on a combination of the first sequence of user inputs and the second sequence of user inputs. In these aspects, determining the concept of the user drawing includes comparing the representation of the user drawing to a plurality of training drawings, each of the plurality of training drawings being associated with a concept of a plurality of predetermined concepts. In these aspects, the method includes extracting feature descriptors from the representation of the user drawing, and mapping the extracted feature descriptors into respective elements of the feature vector of the user drawing. In these aspects, comparing the feature vectors of the images to the feature vector of the user drawing includes determining a vector distance between the feature vector of the user drawing and each of the feature vectors of the images, and selecting one or more of the feature vectors of the images that correspond to a smallest vector distance. In these aspects, generating the search results includes obtaining images of the collection of images which correspond to the selected one or more feature vectors of the images, and providing the obtained images for display to a user of a client device.

According to one embodiment of the present disclosure, a system is provided to detect a first input query identifying a representation of a first user drawing; initiate, in response to detecting the first input query, a first search for images relevant to a concept associated with the first user drawing; generate first search results associated with the first search; provide for display the first search results; detect a second input query identifying a representation of a second user drawing, the second input query being detected subsequent to the first input query; initiate, in response to detecting the second input query, a second search for images relevant to a concept associated with the second user drawing; generate second search results associated with the second search; and provide for display the second search results, the second search results being different than the first search results if the concept associated with the second user drawing is different than the concept associated with the first user drawing.

In certain aspects of the system, the instructions further cause the one or more processors to detect a touch input on a display screen of a client device as part of detecting the first input query or detecting the second input query, the touch input being detected based on an object associated with a user of the client device making contact with the display screen at an input section of a user interface of the client device, and detect removal of the touch input from the display screen, the first search or the second search being initiated in response to detecting the removal of the touch input. In these aspects, the instructions further cause the one or more processors to detect a touch input on a display screen of a client device as part of detecting the first input query or detecting the second input query, the touch input being detected based on an object associated with a user of the client device making contact with the display screen at an input section of a user interface of the client device, and detect a pause in the touch input on the display screen, the first search or the second search being initiated in response to detecting the pause in the touch input. In these aspects, the second user drawing is an extension of the first user drawing to form a final user drawing comprising the first user drawing and the second user drawing. In these aspects, the instructions further cause the one or more processors to generate a library of training drawings, extract feature descriptors of each training drawing in the library, map the extracted feature descriptors of each training drawing to a training vector, and associate a concept of a plurality of predetermined concepts to each training vector, wherein the library of training drawings is generated prior to the first input query being detected. In these aspects, the instructions further cause the one or more processors to generate a probability distribution of the plurality of predetermined concepts, the probability distribution indicating a likelihood for each concept of the plurality of predetermined concepts that the concept corresponds to the user drawing, and select one or more concepts having a likelihood greater than a predetermined threshold, the selected one or more concepts being applied to the first search or the second search. In these aspects, the instructions further cause the one or more processors to extract feature descriptors of the first user drawing, map the extracted feature descriptors of the first user drawing to a feature vector, the feature vector corresponding to a concept associated with the first user drawing, obtain images associated with a concept that match the concept associated with the first user drawing, compute a vector distance between the feature vector of the first user drawing to feature vectors of the obtained images, select one or more images of the obtained images which correspond to a smallest vector distance, and rank the selected one or more images based on the corresponding vector distances of the selected images.

According to one embodiment of the present disclosure, a non-transitory computer readable storage medium including instructions that, when executed by a processor, cause the processor to provide a user interface for display via an application of a client device; detect a first input query in an input section of the user interface, the first input query identifying a representation of a first user drawing, the first user drawing representing at least a portion of a target input drawing; determine, in response to detecting the first input query, whether the target input drawing represents a first concept using a probability distribution of concepts; initiate a first search for images relevant to the first concept if the target input drawing is determined to represent the first concept; generate first search results associated with the first search using the first user drawing as the target input drawing; provide for display the first search results in an output section of the user interface; detect a second input query in the input section, the second input query identifying a representation of a second user drawing, the second input query being detected subsequent to the first input query; determine, in response to detecting the second input query, whether the second user drawing modifies the target input drawing from the first concept to a second concept using the probability distribution of concepts; initiate a second search for images relevant to the second concept if the second user drawing is determined to modify the target input drawing to the second concept, otherwise the second search is initiated to search for images relevant to the first concept; generate second search results associated with the second search using the second user drawing as the target input drawing; and provide for display the second search results in the output section.

In certain aspects of the non-transitory computer-readable storage medium, the instructions further cause the processor to determine a collection of images that is relevant to the first concept, and compare feature vectors of images in the collection of images to a feature vector of the target input drawing, wherein the first search results are generated based on comparison results of the comparison between the feature vector of the target input drawing and the feature vectors of the images. In these aspects, the instructions further cause the processor to generate, in response to receiving the target input drawing, the probability distribution of concepts using user information indicating trends on how users draw each concept of a plurality of predetermined concepts, the probability distribution indicating different likelihood values for each concept based on the target input drawing.

According to one embodiment of the present disclosure, a system is provided for retrieving a set of images identified as responsive to a user drawing serving as an image search query from a user based on features of the user drawing identified as relevant to images having a similar semantic concept. The system includes means for receiving user input identifying a representation of a user drawing, the user drawing representing a search query for initiating an image search. The system also includes means for determining a concept of the user drawing, the concept indicating semantic subject matter in the representation of the user drawing. The system also includes means for determining a collection of images that is relevant to the determined concept. The system also includes means for comparing feature vectors of images in the collection of images to a feature vector of the user drawing. The system further includes means for generating search results associated with the image search based on comparison results of the comparison between the feature vector of the user drawing and the feature vectors of the images.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

Figure 1:
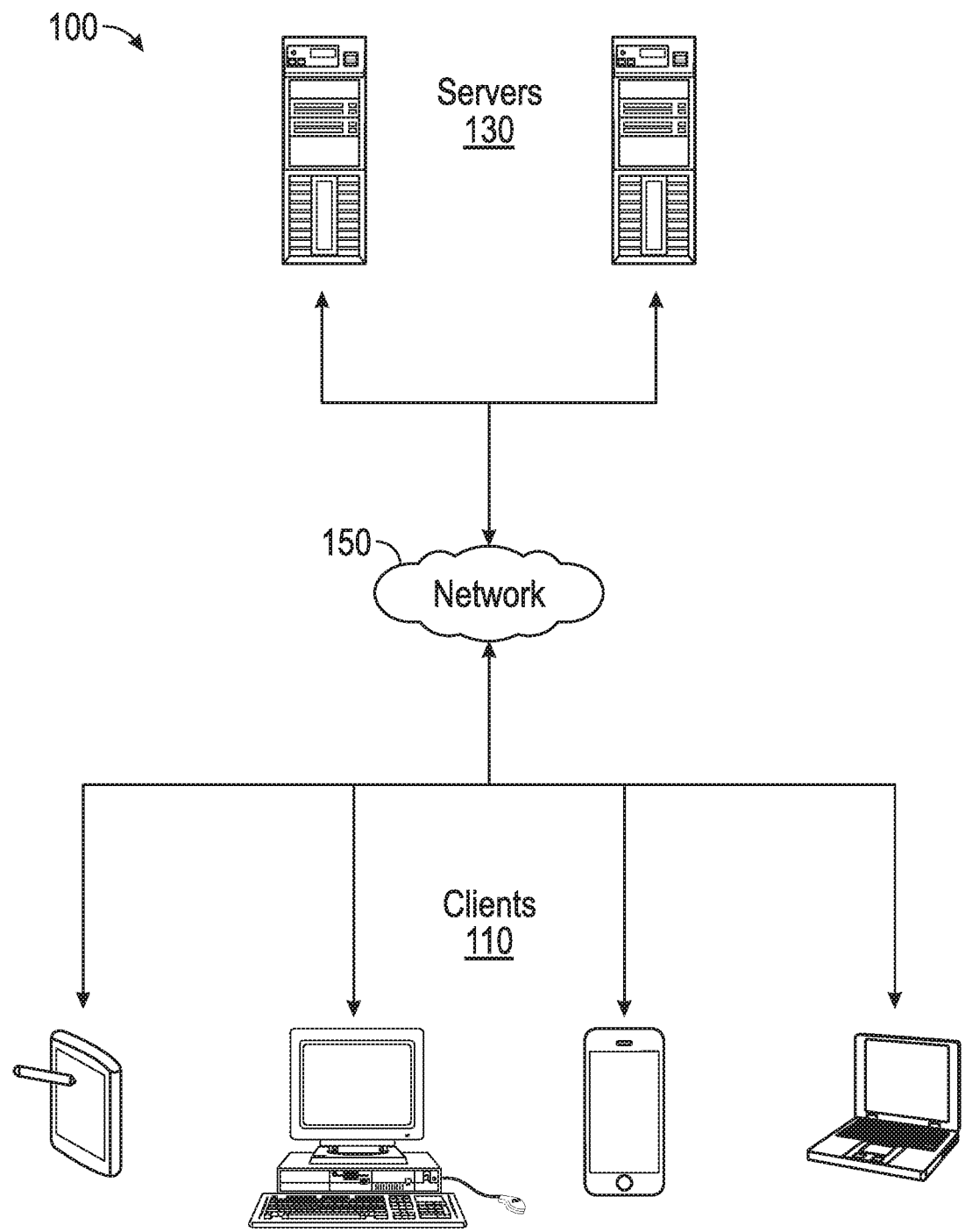
FIG. 1 illustrates an example architecture for a user drawing based image search system suitable for practicing some implementations of the subject technology.

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

There is a problem with current image search engines in that users rely upon text-based image search and upload-based image search when searching for visual content through a media collection. In the text-based approach, the image search initiates a search by parsing keywords from the text-based user query that will drive the search. However, a text entry may identify an image corresponding to a meaning different than what the user originally intended. In the upload-based approach, the image search initiates a search for visual content that closely resembles an image uploaded by a user. However, the process of identifying an image for upload that closely depicts the user's desired result may be burdensome thereby adversely impacting the user experience. Consequently, image searches using text-based queries and/or uploaded-image queries may not accurately identify the most relevant visual content.

The disclosed system addresses this problem specifically arising in the realm of computer technology by providing a solution also rooted in computer technology, namely, by the training of a computer-operated neural network, such as a convolutional neural network, to teach the neural network to identify features of a set of drawings representing how users draw a semantic concept. In this respect, the disclosed system can accept a user-provided drawing identifying a certain semantic concept as an input query to search against images having a similar concept. In certain aspects, the convolutional neural network is operated on a server and accesses large amounts of image data stored in memory of the server or stored elsewhere and accessible by the server in order to train the convolutional neural network. For example, a set of training drawings may be provided to the convolutional neural network in order to teach the convolutional neural network how users draw semantic concepts by identifying features of a training drawing for a corresponding semantic concept.

Once the convolutional neural network has been trained to predict which features of the training drawings identify a corresponding semantic concept, the convolutional neural network can provide a probability (e.g., a probability distribution), for each training drawing, of likelihood that a user-provided drawing would represent a certain semantic concept. For example, the probability distribution indicates different likelihood values for each concept based on a target input drawing.

The proposed solution further provides improvements to the functioning of the computer itself because it saves data storage space and reduces network usage. Specifically, the computer hosting the collection of images to be searched is not required to maintain in data storage or repeatedly share over a network with the convolutional neural network classification information based on the trained semantic concepts for the images to be searched because the convolutional neural network, once trained, is configured to predict which features of the user-provided drawing correlated to a semantic concept identifying those features without this information.

As used herein, the term "semantic concept" refers to the meaning used for understanding an object and/or environment of things. The term "semantic concept" can be interchangeably used with the term "visual word" that captures the semantic space of a thing which could be the target of an image search query.

FIG. 1 illustrates an example architecture 100 for providing a set of images identified as responsive to a user drawing based image search query from a user based on features of the user drawing represented as the image search query. The architecture 100 includes servers 130 and clients 110 connected over a network 150.

One of the many servers 130 is configured to host a computer-operated neural network. The neural network, which can be a convolutional neural network, is trained to identify features of a set of drawings representing how users draw a certain semantic concept. In this respect, the neural network can be trained to identify how users draw different semantic concepts. One of the many servers 130 also hosts a collection of images. The collection of images can be searched using an image search engine (e.g., accessible through a web page on one of the clients 110). Images from the collection can also be used to train the neural network to identify features of the images and, with the addition of data indicating an association between the images and corresponding semantic concept, once identified, are likely to indicate that the corresponding image is more likely to be relevant to the semantic concept identified by a user drawing serving as the image search query. For purposes of load balancing, multiple servers 130 can host the neural network and multiple servers 130 can host the collection of images.

The servers 130 can be any device having an appropriate processor, memory, and communications capability for hosting the neural network, the collection of images, and the image search engine. The image search engine is accessible by various clients 110 over the network 150. The clients 110 can be, for example, desktop computers, mobile computers, tablet computers (e.g., including e-book readers), mobile devices (e.g., a smartphone or PDA), or any other devices having appropriate processor, memory, and communications capabilities for accessing the image search engine on one of the servers 130. The network 150 can include, for example, any one or more of a local area network (LAN), a wide area network (WAN), the Internet, and the like. Further, the network 150 can include, but is not limited to, any one or more of the following network topologies, including a bus network, a star network, a ring network, a mesh network, a star-bus network, tree or hierarchical network, and the like.

Figure 2:
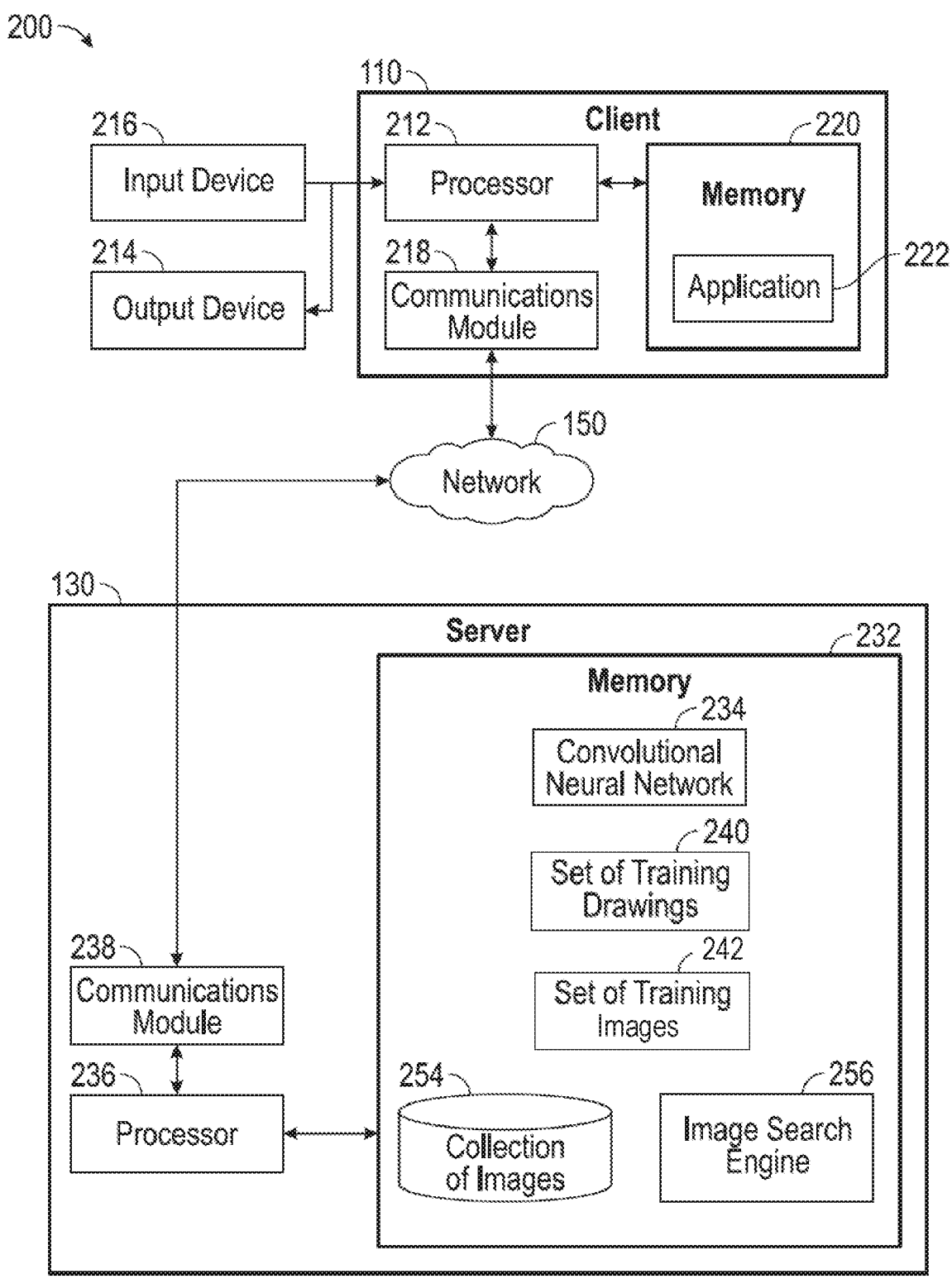
FIG. 2 is a block diagram illustrating an example client and server from the architecture of FIG. 1 according to certain aspects of the disclosure.

FIG. 2 is a block diagram 200 illustrating an example server 130 and client 110 in the architecture 100 of FIG. 1 according to certain aspects of the disclosure. The client 110 and the server 130 are connected over the network 150 via respective communications modules 218 and 238. The communications modules 218 and 238 are configured to interface with the network 150 to send and receive information, such as data, requests, responses, and commands to other devices on the network. The communications modules 218 and 238 can be, for example, modems or Ethernet cards.

The server 130 includes a processor 236, a communications module 238, and a memory 232. The memory 232 of the server 130 includes a convolutional neural network 234. As discussed herein, a convolutional neural network 234 is a type of feed-forward artificial neural network where individual neurons are tiled in such a way that the individual neurons respond to overlapping regions in a visual field. The architecture of the convolutional neural network 234 may be in the style of existing well-known image classification architectures such as AlexNet, GoogLeNet, or Visual Geometry Group models. In certain aspects, the convolutional neural network 234 consists of a stack of convolutional layers followed by several fully connected layers. The convolutional neural network 234 can include a loss layer (e.g., softmax or hinge loss layer) to back propagate errors so that the convolutional neural network 234 learns and adjusts its weights to better fit provided image data.

The memory also includes a collection of images 254 and an image search engine 256 for searching the collection of images 254. Also included in the memory 232 of the server 130 is a set of training drawings 240 and a set of training images 242. As discussed herein, the set of training drawings include image data that represents a trend on how users draw semantic concepts.

The set of training drawings 240 can be, for example, a dataset of drawings consisting of a predetermined number of classes (e.g., about 10,000) with a predetermined number of drawings per class. The classes can correspond to visual words representing the semantic concepts (e.g., dog, boat, hammer, bridge, etc.). The set of training drawings 240 may include drawing vector information and drawing cluster information, in which the drawing vector information identifies training vectors representing a large sample of training drawings and the drawing cluster information identifies clusters representing respective visual words. In this respect, the vectors corresponding to a semantic concept are clustered into one cluster representing that semantic concept.

Similar to the set of training drawings 240, the set of training images 242 can be, for example, a dataset of image content items consisting of a predetermined number of classes (e.g., about 10,000) with a predetermined number of image content items per class. The classes can correspond to visual words representing the semantic concepts. The set of training images 242 may include image vector information and image cluster information, in which the image vector information identifies training vectors representing a large sample of training images and the image cluster information identifies clusters representing respective visual words.

The collection of images 254 can be, for example, a dataset of images consisting of a predetermined number of classes (e.g., 10,000) with image vector information and image cluster information. The image vector information identifies vectors representing a large sample of images (e.g., about 50 million) and the image cluster information identifies the vectors in one or more clusters representing respective visual words such that each of the cluster of images represents a visual word or semantic concept.

Although the set of training drawings 240 and the set of training images 242 are illustrated as being separate from the collection of images 254, in certain aspects the set of training drawings 240 and the set of training images 242 are each a subset of the collection of images 254. Furthermore, although the collection of images 254 and the image search engine 256 are illustrated as being in the same memory 232 of a server 130 as the convolutional neural network 234, in certain aspects the collection of images 254 and the image search engine 256 can be hosted in a memory of a different server but accessible by the server 130 illustrated in FIG. 2.

The processor 236 of the server 130 is configured to execute instructions, such as instructions physically coded into the processor 236, instructions received from software in memory 240, or a combination of both. For example, the processor 236 of the server 130 executes instructions to submit a plurality of training drawings representing how users identify different semantic concepts to the convolutional neural network 234 that is configured to analyze image pixel data for each of the plurality of training drawings to identify features, in each of the plurality of training drawings, corresponding to a predetermined semantic space and receive, from the neural network 234 and for each of the plurality of training drawings, a probability of likelihood that the training drawing identifies a certain semantic concept.

In certain aspects, the semantic concept used by the neural network 234 is identified in response to a search query. Specifically, in certain aspects, the processor 236 of the server 130 is configured to receive a user input from a user. The user input identifies a representation of a user drawing. In this respect, the user drawing serves as the search query (e.g., for the image search engine 256) for the collection of images 254. The user input is received, for example, by the user accessing the image search engine 256 over the network 150 using an application 222 in memory 220 on a client 110 of the user, and the user submitting the user input using an input device 216 of the client 110. For example, the user may use the input device 216 to create the user drawing. In response to the user input for the search query, a processor of the client 110 is configured to transmit the search query over the network 150 using the communications module 218 of the client 110 to the communications module 238 of the server 130.

The processor 236 of the server 130, upon receiving the search query for the image search engine 256, is configured to submit the search request for the search query to the image search engine 256. The processor 236 then receives an identification of plurality of images, having a similar semantic concept as the search query, from the collection of images 254 that are responsive to the search query, and is configured to provide a listing of the plurality of images with a ranking according to a vector distance relative to a feature vector of the user drawing. The listing of the plurality of images that is prioritized (or ranked) according to the vector distance relative to a feature vector of the user drawing is provided, for example, by the processor 236 of the server 130 being configured to submitting the plurality of images that are responsive to the search query to the convolutional neural network 234, and the convolutional neural network 234 identifying the semantic concept associated with the user drawing of the user input. The processor 236 may then prioritize the listing of the plurality of images according to the provided semantic concept, and provide the listing to the application 222 on the client 110 over the network 150 for display by an output device 214 of the client 110.

In certain aspects, the processor 236 of the server 130 is configured to receive a user input identifying a representation of a user drawing, in which the user drawing represents a search query for initiating an image search. A user of the client 110 may use the input device 216 to draw one or more objects via an user interface of the application 222. The user interface may include an input section where the objects can be drawn. The input section may include one or more controls for adjusting properties such as color to provide an enhanced representation of the user drawing. The controls may include a control to select a style of drawing lines, a size of the drawing lines and at least one of the colors of a color palette.

In some aspects, the processor 236 of the server 130 is configured to determine a semantic concept of the user drawing. The processor 236 may submit the search query from the client 110 to the convolutional neural network 234 to identify the semantic concept associated with the user drawing based on one or more features of the user drawing. In this respect, the convolutional neural network 234 may predict the semantic concept of the user drawing by correlating the features of the user drawing with training information gathered from the set of training drawings 240.

In certain aspects, the processor 236 is configured to determine a collection of images that is relevant to the determined semantic concept. The processor 236 may determine that a subset of the collection of images is associated with the semantic concept thereby alleviating the amount of image data to process during the image search. In this respect, the processor 236 may call the image search engine 256 to search against images that have a similar concept. In one aspect, the subset of images associated with the determined semantic concept are identified by mapping data identifying relationships between each of the collection of images and one or more semantic concepts. For example, an image depicting an ocean coast with a sandy beach may be associated with one or more semantic concepts (e.g., beach, paradise, tropical, vacation, etc.).

In one or more aspects, the processor 236 of the server 130 is configured to compare feature vectors of images in the collection of images to a feature vector of the user drawing. The feature vectors of the images determined to have a similar concept to the user drawing may have their features extracted in advance (e.g., prior to receipt of any image search query) such that the feature vectors are part of the collection of images 254. In some implementations, the feature vectors of the images may be stored in a separate data structure than the repository containing the collection of images 254. In one or more implementations, the feature vectors of the images are extracted in response to user input containing an image search query. In this implementation, the images having a similar concept may be submitted to a feature extractor to obtain features of the images which can then be mapped to one or more elements of corresponding feature vectors. Similarly, the user drawing may be submitted to the feature extractor to obtain features of the user drawing which are then mapped onto a feature vector for comparison to the feature vectors of the images. The feature extractor, for example, may be a part of the convolutional neural network 234 depending on implementation. In other examples, the feature extractor may be separate from the convolutional neural network 234 and operably coupled to the convolutional neural network 234.

In comparing the feature vectors of the images to the feature vector of the user drawing, the processor 236 may determine a vector distance between the feature vector of the user drawing and each of the feature vectors of the images. Subsequently, the processor 236 determines which of the feature vectors of the images correspond to a smallest vector distance. The processor 236 then selects those feature vectors with the smallest vector distances. In other aspects, the processor 236 can compare each of the vector distances to a predetermined threshold to determine whether one or more of the compared vector distances are smaller than the predetermined threshold. The processor 236 may then select one or more of the feature vectors of the images that are determined to have a vector distance that is smaller than the predetermined threshold.

In some aspects, the processor 236 of the server 130 is configured to generate search results associated with the image search based on comparison results of the comparison between the feature vector of the user drawing and the feature vectors of the images. For example, the processor 236 may generate the search results by obtaining images of the collection of images which correspond to the selected one or more feature vectors of the images (e.g., images with the smallest vector distances). The processor 236 may prioritize the search results based on the vector distance between the feature vector of the user drawing and the feature vectors of the images. In some examples, the search results may include a listing of images corresponding to a vector distance in ascending order (e.g., image with the smallest vector distance to the user drawing is listed near top of listing with images with the next smallest distances are listed next). In this respect, the search results include a listing of images that closely resemble the user drawing (or sketch) within a semantic space.

Figure 3:
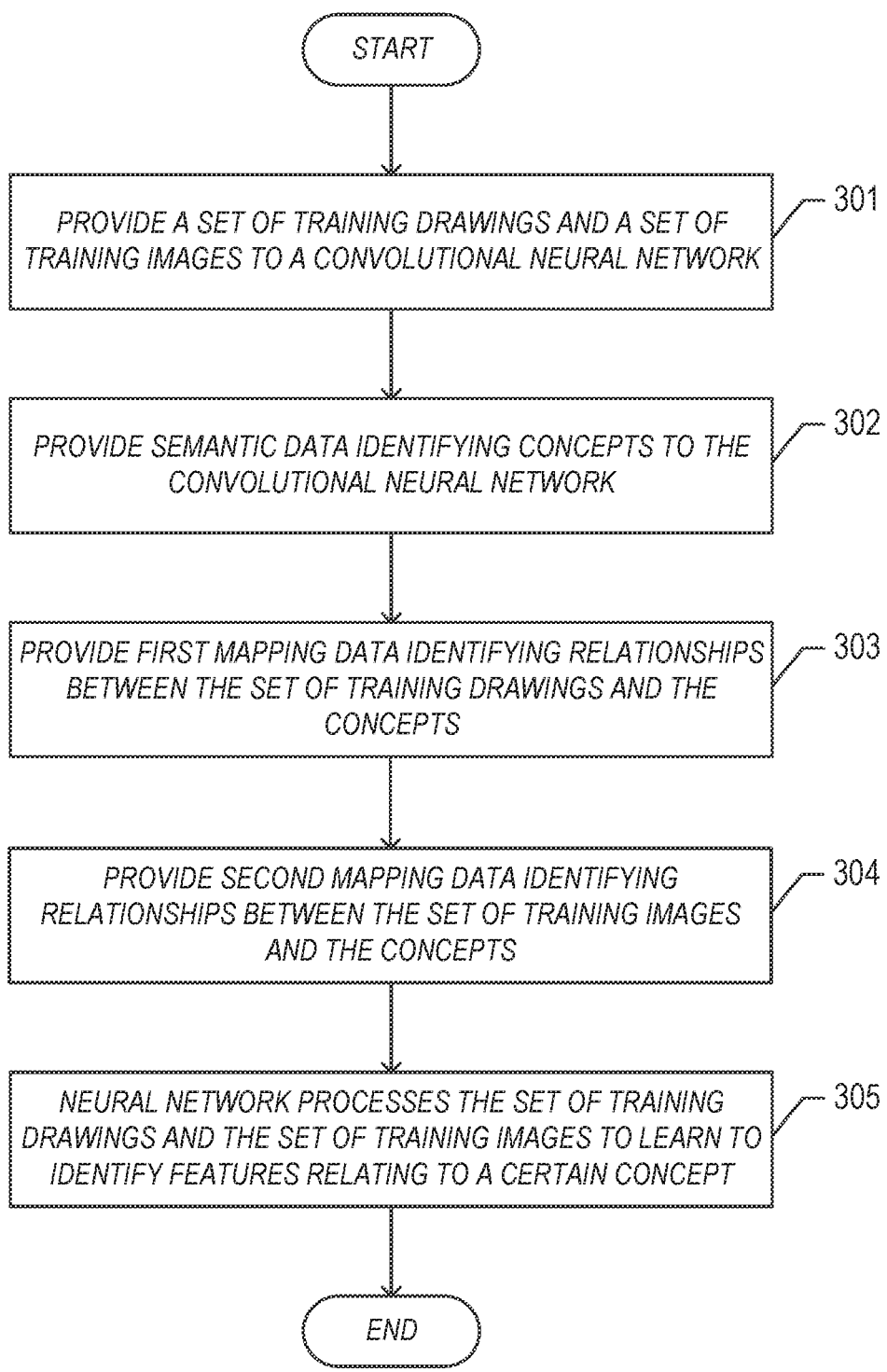
FIG. 3 illustrates an example process for training a convolutional neural network to analyze image pixel data to identify features in example user drawings using the example server of FIG. 2.

FIG. 3 illustrates an example process 300 for training a convolutional neural network to analyze image pixel data to identify features in example user drawings using the example server of FIG. 2. While FIG. 3 is described with reference to FIG. 2, it should be noted that the process steps of FIG. 3 may be performed by other systems.

The process 300 begins by proceeding from beginning step to step 301 when a set of training drawings 240 and a set of training images 242 are fed through a convolutional neural network 234. For example, the convolutional neural network 234 can consist of a stack of eight layers with weights, the first five layers being convolutional layers and the remaining three layers being fully-connected layers. The set of training drawings 240 and the set of training images 242 can each be fixed-size 256×256 pixel Black-White image data or Red-Green-Blue (RGB) image data.

Subsequently, in step 302, semantic data identifying concepts is provided to the convolutional neural network 234. The semantic data may include a listing of visual words and/or semantic concepts which correspond to respective meanings for an object or thing. The processor 236 may be configured to submit a portion of the semantic data to the convolutional neural network 234 when a corresponding training drawing or set of training drawings is fed to the convolutional neural network 234 for correlating the fed training drawings to the semantic concept identified in the portion of the semantic data. In one or more aspects, the semantic data may be indexed based on the training drawing and/or set of training drawings fed to the convolutional neural network 234 to identify the semantic concept corresponding to the index.

In step 303, first mapping data identifying relationships between the set of training drawings 240 and the concepts identified by the semantic data can be provided to the convolutional neural network 234. The first mapping data, for example, may include predetermined mapping information which identifies a mapping between a first semantic concept and one or more user drawings identifying how users draw the first semantic concept. The mapping information can identify additional mappings between the one or more user drawings and other semantic concepts. In addition, the mapping information can include additional mappings between a cluster of training drawings and a corresponding semantic concept such that the training drawings are indexed by a corresponding cluster identifier.

In step 304, second mapping data identifying relationships between the set of training images 240 and the concepts identified by the semantic data can be provided to the convolutional neural network 234. The second mapping data, for example, may include predetermined mapping information which identifies a mapping between a first semantic concept and one or more images identifying content that resembles the first semantic concept. In addition, the mapping information can include additional mappings between a cluster of training images and a corresponding semantic concept such that the training images are indexed by a corresponding cluster identifier.

Next, in step 305, the convolutional neural network 234 processes the set of training drawings 240 and the set of training images 242 in order to learn to identify image features by analyzing pixel data of the user drawings in the set of training drawings 240 and pixel data of image content items in the set of training images 242. Training with the set of training drawings 240 and the set of training images 242 may be regularized by weight decay and dropout regularization for the first two fully-connected layers with a dropout ratio set to 0.5, and the learning rate may initially be set to $10^{-2}$ and then decreased by a factor of 10 when validation set accuracy stops improving for the convolutional neural network 234.

In other aspects, the features extracted using the model generated by the convolutional neural network 234 as trained in step 305 is implemented with three fully connected layers of the convolutional neural network 234. The extracted features may be then fed into a multinomial logistic regression to map them to their respective semantic concept (e.g., from the semantic data and mapping data). As a result, after step 305, the convolutional neural network 234 provides a trained model specialized to understand and identify features in both user drawings and images in order to detect correlations between user drawings serving as image search queries and candidate images that are responsive to such image search queries. The process 300 ends by terminating at the ending step.

Figure 4:
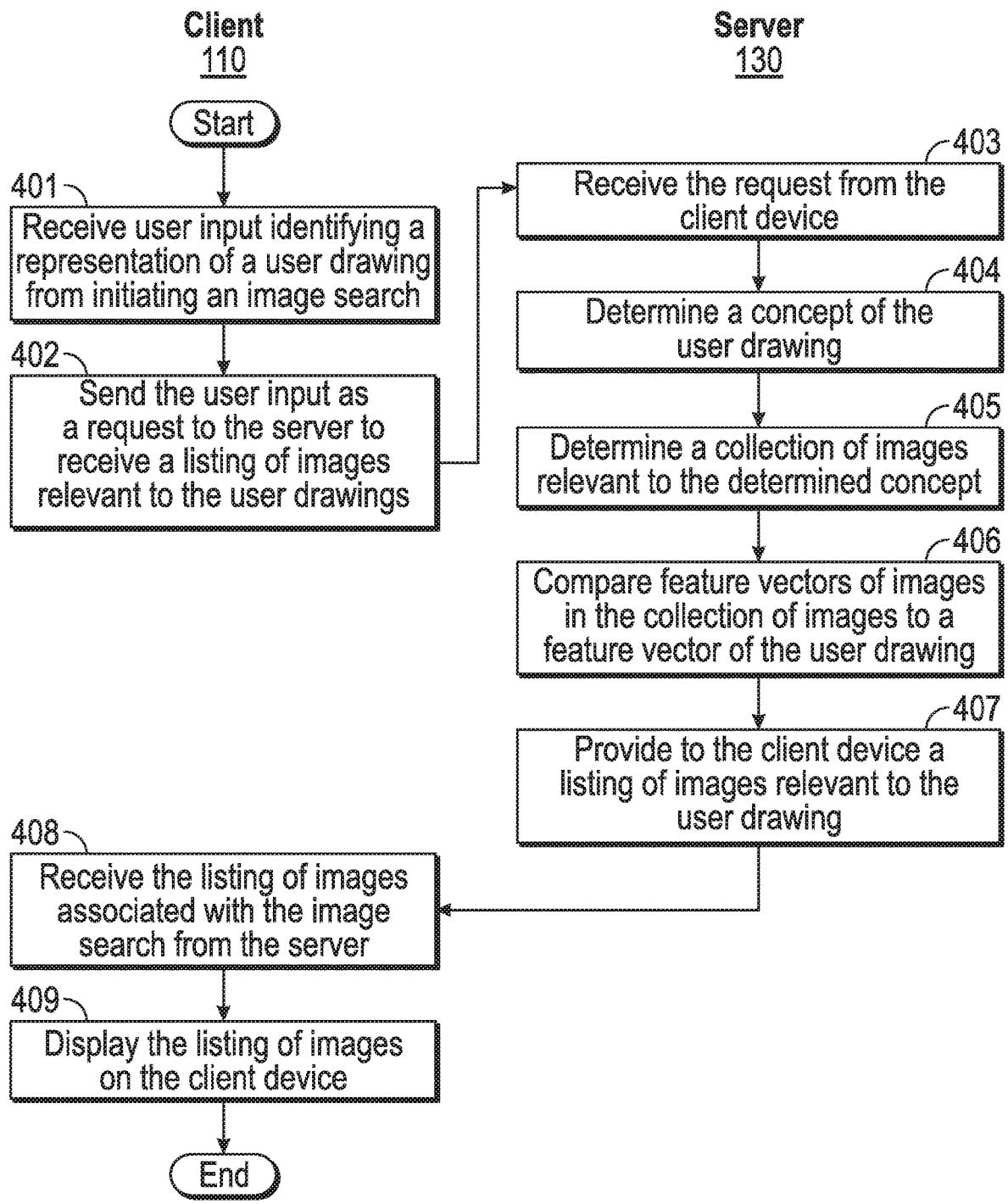
FIG. 4 illustrates an example process for user drawing based image search using the example client and server of FIG. 2.

FIG. 4 illustrates an example process 400 for user drawing based image search using the example client and server of FIG. 2. The process 400 begins in step 401 when a user, for example, loads an application 222 on a client 110 and the client 110 receives an input from the user using the input device 216 for a search query for a collection of images 254. The input identifies a representation of a user drawing for initiating an image search. The user can utilize the input device 216 to draw one or more objects via a user interface of the application 222.

The client 110 may detect a touch input on a display screen of the client 110 as part of detecting one or more inputs from the user. The touch input may be detected based on an object (e.g., stylus, fingertip, etc.) associated with the user of the client 110 making contact with a display screen at an input section of a user interface of the application 222. The client 110 may detect removal of the touch input from the display screen. In this respect, one or more image searches may be initiated in response to detecting the removal of the touch input. In one aspect, the client 110 detects a pause in the touch input on the display screen. In turn, the image search may be initiated in response to detecting the pause in the touch input.

Next, in step 402, the application 222 on the client 110 sends the user input to the server 130 in order to receive a listing of images responsive to the search query, particularly images relevant to the user drawing. Turning to the server 130, in step 403, the server 130 receives the user input for the search query for a collection of images from the client 110.

Subsequently, in step 404, the server 130 determines a semantic concept of the user drawing, and submits a search request with an indication of the determined semantic concept for the search query to an image search engine 256 for the collection of images 254. Next, in step 405, an identification of a plurality of images from the collection of images 254 that are responsive to the search query is received. In this respect, the plurality of images are identified to be associated with the determined semantic concept which represent a subset of the overall number of images in the collection of images 254, thereby alleviating the image search burden by reducing the volume of images to search against.

In step 406, the plurality of images are submitted to a computer-operated convolutional neural network 234 that is configured to analyze image pixel data for each of the plurality of images to identify features in each of the plurality of images for comparison against features of the user drawing. The user drawing may be submitted to the convolutional neural network 234 to extract a feature vector. In some aspects, the client 110 extracts a feature vector of the user drawing, and submits the extracted feature vector to the server 130 as part of the input from the user. The server 130 can compare the feature vectors of the subset of images to the feature vector of the user drawing. The comparison can yield comparison results identifying a prioritized listing of vector distances between the user drawing and each of the subset of images. In many aspects, the feature vectors identify both semantic information (e.g., thing is a duck, thing is a shoe, etc.) and visual information (e.g., color, composition, lighting, etc.). In this respect, the prioritized listing of vector distances are prioritized according to matching features in both the semantic and visual domains.

Subsequently, in step 407 the server 130 provides the client 110 with a listing of the plurality of images that is prioritized according to the prioritization of vector distances relative to the user drawing. Turning to the client 110, in step 408, the client 110 receives the listing of the plurality of images associated with the image search from the server 130. Next, in step 409, the listing of the plurality of images is provided for display via the application 222 of the client 110.

Figure 5:
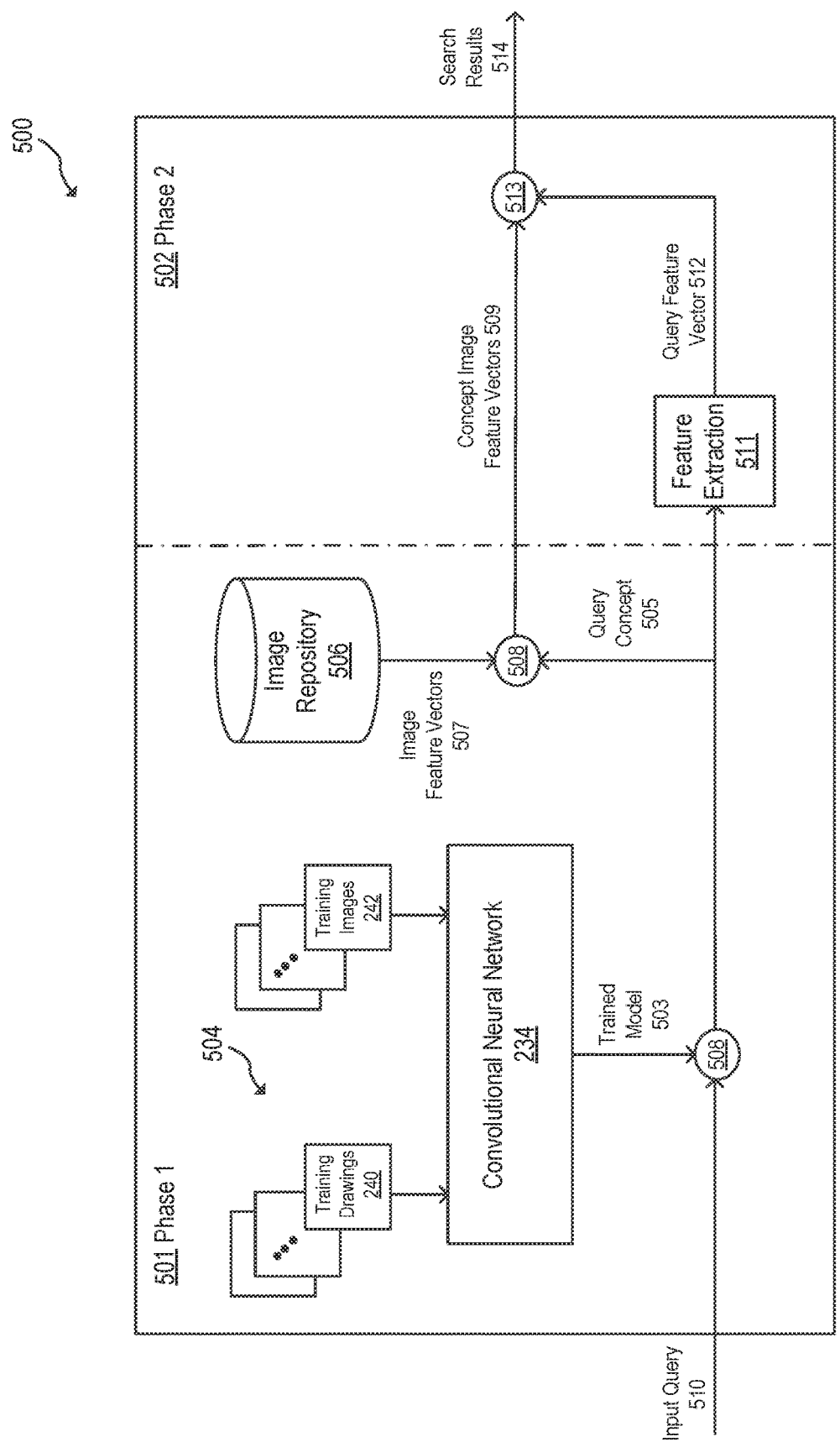
FIG. 5 illustrates a schematic diagram of an example architecture suitable for practicing the example process of FIG. 4.

FIG. 5 illustrates a schematic diagram of an example architecture 500 suitable for practicing the example process of FIG. 4. The architecture 500 illustrates the process of FIG. 4 as a two-phase process, where a first phase 501 relates to a concept determination phase and a second phase 501 relates to a feature comparison phase. In this respect, the architecture 500 provides for a user drawing based input search query to search for images having a similar concept and similar visual features. In one or more embodiments, the operations relating to the training of the convolutional neural network 234 are performed independent of the operations relating to the processing of an input query 510 such that operations relating to the neural network training may be performed offline and prior to the input query 510 being received.

The processor 236 of the server 130 may submit a plurality of training drawings (e.g., 240) representing how users identify different semantic concepts as well as a plurality of training images (e.g., 242) to the convolutional neural network 234 that is configured to analyze image pixel data for each of the plurality of training drawings and for each of the plurality of training images to identify features, in each of the plurality of training drawings and training images, corresponding to a predetermined semantic space. The processor 236 may generate a library of training data 504 that compiles the training drawings 240 and the training images 242, which may be stored separately from image repository 506 or as part of the image repository 506. In some aspects, the convolutional neural network 234 may store indexes identifying respective locations of the training drawings and the training images. The convolutional neural network 234 may extract feature descriptors of each training drawing and each training image in the library of training data 504, and map them to respective elements of a feature vector.

In turn, the convolutional neural network 234, for each of the plurality of training drawings, may provide a probability of likelihood that the training drawing identifies a certain semantic concept. For example, the convolutional neural network 234 may generate a probability distribution for a plurality of predetermined concepts, in which the probability distribution indicates a range of probabilities for respective concepts of the plurality of predetermined concepts that the concept correctly applies to an input user drawing. In one or more embodiments, the convolutional neural network 234 includes the probability distribution as part of a trained model 503. The trained model 503 is supplied to element 508 to process the input query 510 and identify the corresponding semantic space.

In certain aspects, the processor 236 of the server 130 is configured to receive the input query 510 from a user. The input query 510 identifies a representation of a user drawing generated at the client 110. Upon receiving the input query 510, the processor 236 provides the input query 510 through the trained model 503 at element 508 to identify the semantic concept associated with the user drawing based on one or more features of the user drawing. In this respect, the trained model 503 may be used to predict the semantic concept of the user drawing by correlating the features of the user drawing with training information gathered from the set of training drawings 240. For example, the trained model 503 may be used to select one or more concepts having a likelihood value that is greater than a predetermined threshold using the probability distribution. In turn, the selected one or more concepts is applied to the input query 510 at element 508. In this example, the element 508 outputs a query concept 505 indicating the concept associated with the input query 510.

The processor 236, upon receiving the query concept 505, is configured to submit a search request with the query concept 505 for a search query to the image search engine 256. The processor 236 then receives an identification of plurality of images, having a similar semantic concept as the search query, from the collection of images 254 that are responsive to the search query. The collection of images 254 may be stored in an image repository 506 accessible to the server 130. The identification of the plurality of images may include image feature vectors 507 extracted from each image from the image repository 506. The processor 236 may determine which of the feature vectors 507 is associated with a similar concept. In this embodiment, the query concept 505 is compared against the feature vectors 507 to identify the subset of images (e.g., 509) having a similar concept as that identified by the query concept 505. In one aspect, the subset of images associated with the determined semantic concept are identified by mapping data identifying relationships between each of the collection of images and one or more semantic concepts. In other aspects, the query concept 505 may be compared against metadata of each image, in which the metadata includes a tag or identifier indicating the associated concept.

The query concept 505 is also submitted to a feature extraction module 511 to extract features of the user drawing which are then mapped onto a feature vector for comparison to the concept image feature vectors 509. The feature extraction module 511, for example, may be a part of the convolutional neural network 234 depending on implementation. In other examples, the feature extractor may be separate from the convolutional neural network 234 and operably coupled to the convolutional neural network 234. In this embodiment, the feature extraction module 511 is operable on a different signal path than the convolutional neural network 234 to support independent processing of the input query 510.

In turn, the feature extraction module 511 outputs the query feature vector 512 for comparison to the concept image feature vectors 509 at element 513. In one or more implementations, the extracted features of the input query 510 are stored in the memory 232, and fed back to the convolutional neural network 234 for an iterative round of training offline (e.g., performed prior to any subsequently-received input queries).

The processor 236 provides search results 514 with a ranking according to a vector distance relative to a feature vector of the user drawing. The processor 236 may provide the ranked search results 514 to the application 222 on the client 110 over the network 150 for display by an output device 214 of the client 110.

Figure 6A:
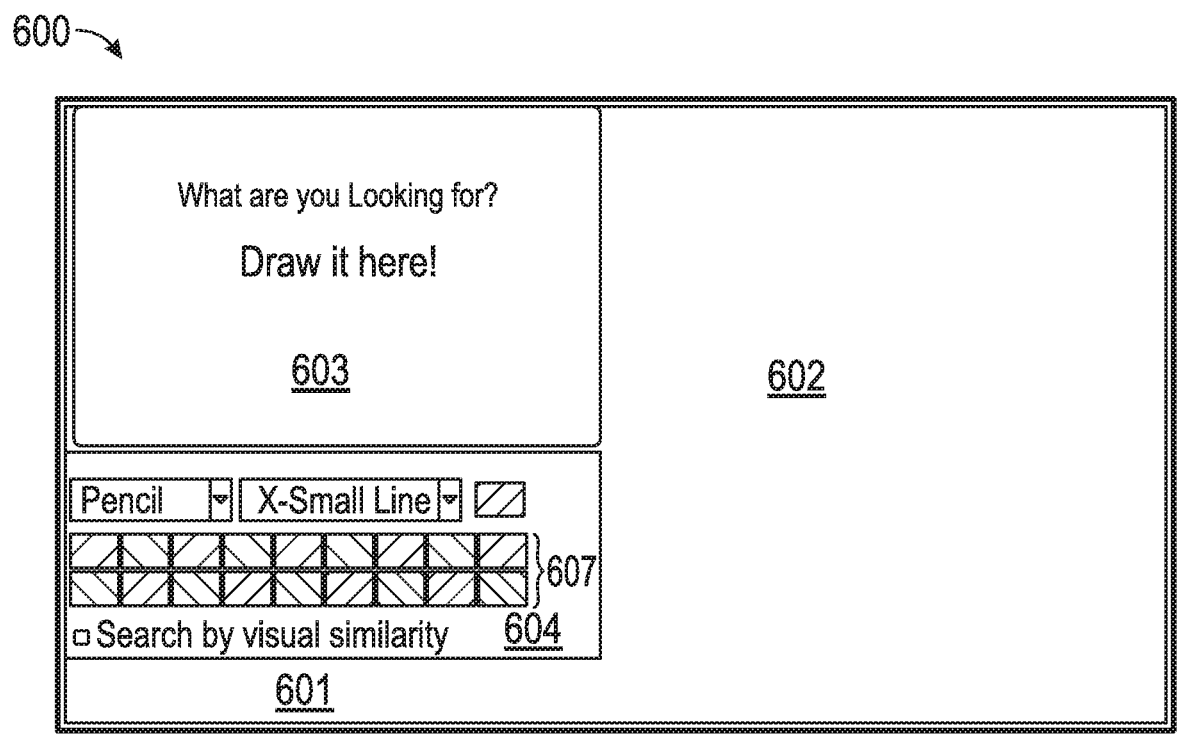
FIGS. 6A-6E illustrates examples of a display including a user interface for user drawing based image search of a first concept according to certain aspects of the subject technology.
Figure 6B:
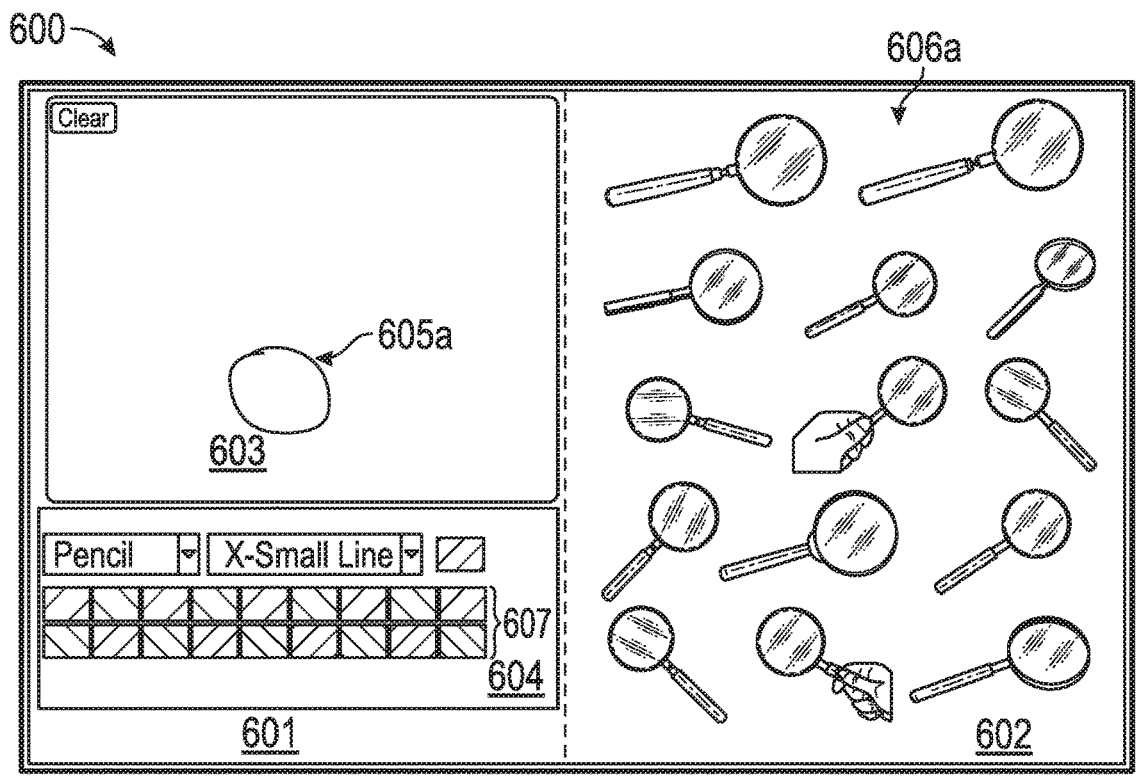
Figure 6C:
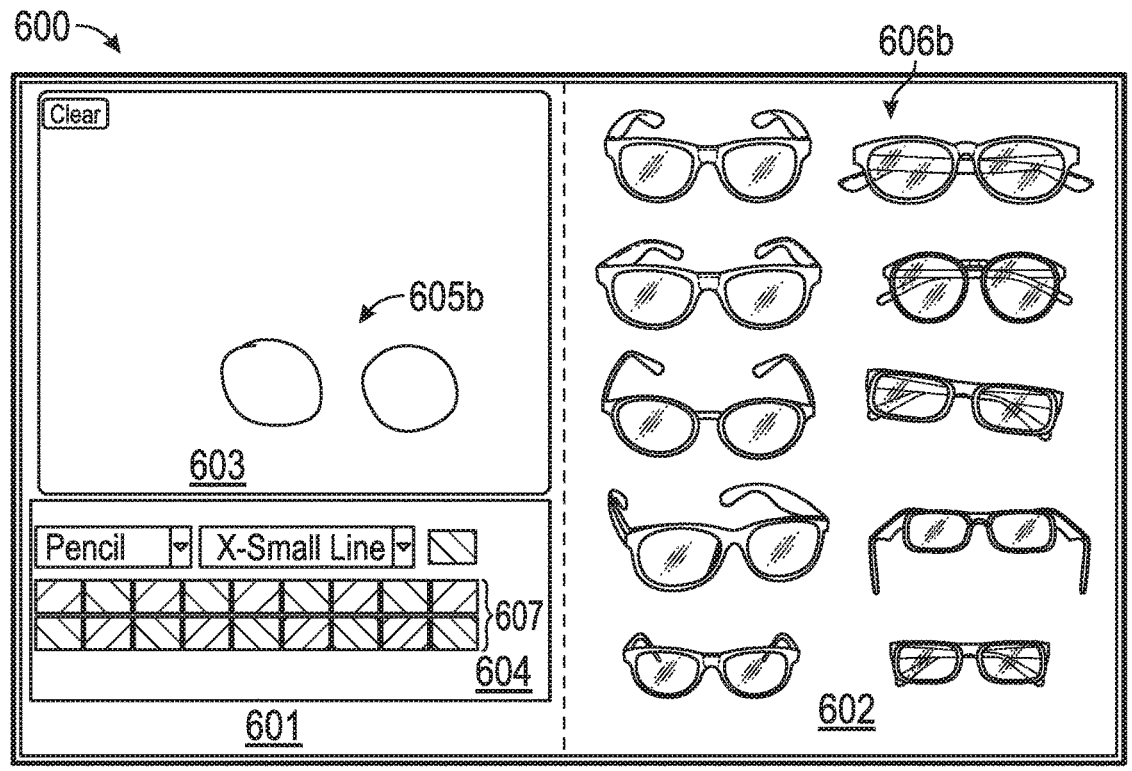
Figure 6D:
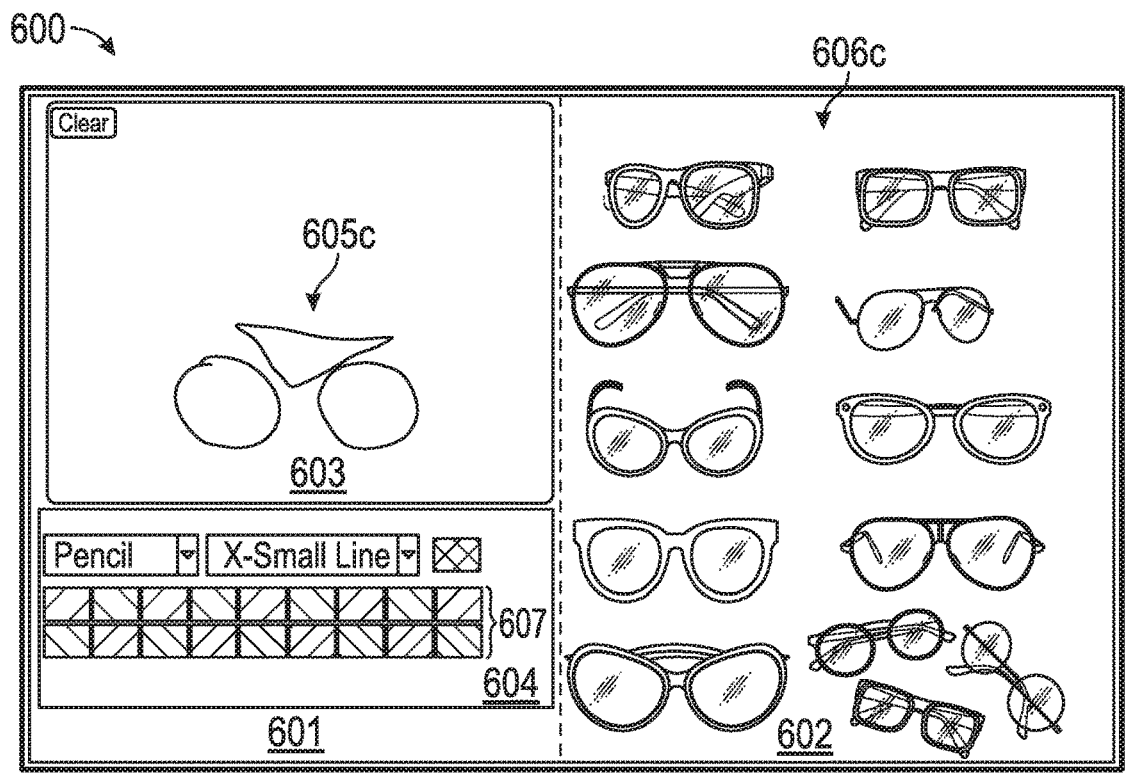
Figure 6E:
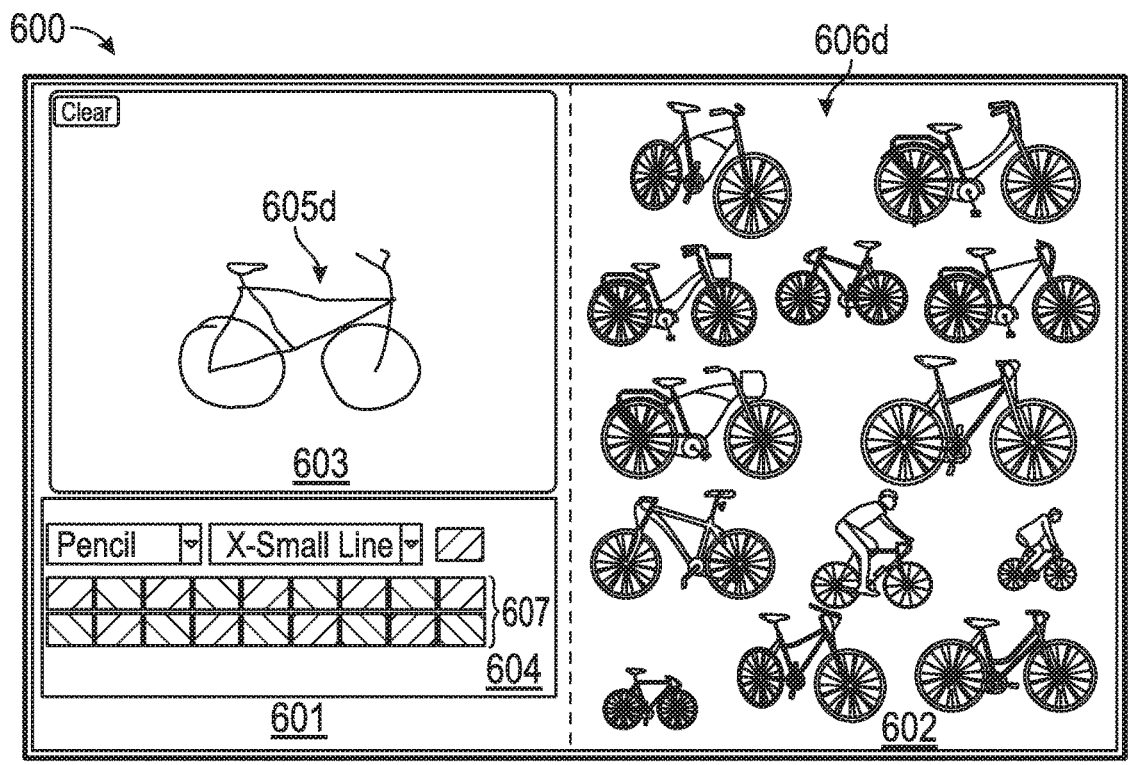

FIGS. 6A-6E example illustrations of a prioritizing a set of images identified as responsive to a user drawing based image search query according to certain aspects of the subject technology. Specifically, FIG. 6A provides an example user interface 600 for initiating a user drawing based image search via an application 222 responsive to a user drawing serving as an image search query. FIG. 6B provides an example illustration of a prioritization for a listing of images 606a displayed in the user interface 600 responsive to a first image search query. FIG. 6C provides an example illustration of a prioritization for a listing of images 606b displayed in the user interface 600 responsive to a second image search query. FIG. 6D provides an example illustration of a prioritization for a listing of images 606c displayed in the user interface 600 responsive to a third image search query. FIG. 6E provides an example illustration of a prioritization for a listing of images 606d displayed in the user interface 600 responsive to a fourth image search query.

In FIG. 6A, the user interface 600 includes an input section 601 and an output section 602. The input section 601 includes a blank canvas 603 for receiving a user drawing using one or more input tools (e.g., drawing line style, drawing line color, drawing line size) from a control panel 604. Search results responsive to an image search query are provided for display via the output section 602. In some aspects, the input section 601 includes a control to clear the blank canvas 603. In other aspects, the control panel 604 includes a control to alter the background color of the blank canvas 603 using a color from the color palette.

In certain aspects, the processor 236 of the server 130 is configured to detect a first sequence of user inputs identifying a first portion of a user drawing (see FIG. 6B). In one or more implementations, the first sequence of user inputs includes pixel coordinates corresponding to a two-dimensional representation of a first drawing stroke. In FIG. 6B, the first drawing stroke of the user drawing identifies an object resembling a single black-lined circle. In this example, the black-lined circle object represents a first image search query. In turn, the convolutional neural network 234 identifies the black-lined circle object as a "magnifying glass" semantic concept. In some embodiments, the semantic concept is determined in response to the detection of the first sequence of user inputs. In this respect, images from the collection of images 254 as having a similar semantic concept (e.g., "magnifying glass") are obtained. The listing of images 606a includes relevant images by filtering images in the semantic space based on vector distances relative to the user drawing feature vector. For example, the listing of images 606a includes images of magnifying glasses. In this embodiment, the search results may be provided for display within the output section 602 in real-time (or on-the-fly) once a drawing stroke is detected within the blank canvas 603 of the input section 601. In some embodiments, the search results are provided at an interval of time. For example, if a user begins a complicated drawing stroke that takes about 10 seconds to complete, the processor 236 of the server 130 can receive a snapshot of the drawing at periodic intervals (e.g., every 100 milliseconds, every 50 milliseconds, every 10 milliseconds, or the like) from the client 110 so that more real-time feedback can be provided to the user before the user is expected to complete the drawing.

The processor 236 may detect a second sequence of user inputs identifying a second portion of the user drawing (see FIG. 6C). In this embodiment, the second sequence of user inputs is detected subsequent to the first sequence of user inputs. The second sequence of user inputs can include a second plurality of pixel coordinates corresponding to a two-dimensional representation of a second drawing stroke. In FIG. 6C, the second drawing stroke of the user drawing 605*b* identifies an object resembling a second black-lined circle. In this example, the two black-lined circle objects represent a second image search query. In turn, the convolutional neural network 234 identifies the two black-lined circle objects as a "pair of eyeglasses" semantic concept. In this embodiment, the semantic concept changes from the "magnifying glass" concept to the "pair of eyeglasses" concept in response to the detection of the second sequence of user inputs. In this respect, the search results would be retrieved in relation to the new concept. For example, the listing of images 606*b* includes images of eyeglasses.

The processor 236 may detect additional sequences of user inputs identifying additional portions of the user drawing (see FIGS. 6D and 6E). In FIG. 6D, a third drawing stroke of the user drawing 605*c* identifies an object resembling a red triangle (facing down). In this example, the two black-lined circle objects in conjunction with the triangle shape represent a third image search query. In turn, the convolutional neural network 234 identifies the triangle shape and two black-lined circle objects as a "glasses" semantic concept. The addition of the red triangle altered the search results to include images of glasses with red features. In this respect, the listing of images 606*c* includes images of sunglasses and eyeglasses, particularly some images illustrating red-colored frames and/or red-colored lenses. In this embodiment, the concept is determined based on a combination of multiple sequences of user inputs.

In FIG. 6E, additional drawing strokes of the user drawing 605*d* identify additional objects resembling a "frame," "seat" and "handle bars" to form a final user drawing. In this example, the additional drawing strokes represent a fourth image search query. In turn, the convolutional neural network 234 identifies the new object now containing "handle bars" and "seat" as a "bicycle" semantic concept. In this respect, the listing of images 606*d* includes images of bicycles. Although the illustration of two standalone black circles identified one semantic concept (see FIG. 6C), the addition of the additional shapes (e.g., frame and handle bars) to the original shape and/or objects transformed the original drawing into a completely different semantic concept (see FIG. 6E). As such, the search results can adapt to each change detected with respect to the user drawing input. As discussed herein, the process of detecting and processing drawing strokes can apply to an additional arbitrary number of subsequent sequences with a user's each next drawing stroke until the user is finished drawing their input image (or user drawing). In some aspects, the subsequent sequences of user drawing strokes involve different colors, different line weights (e.g., different brush thicknesses), and the like.

Figure 7A:
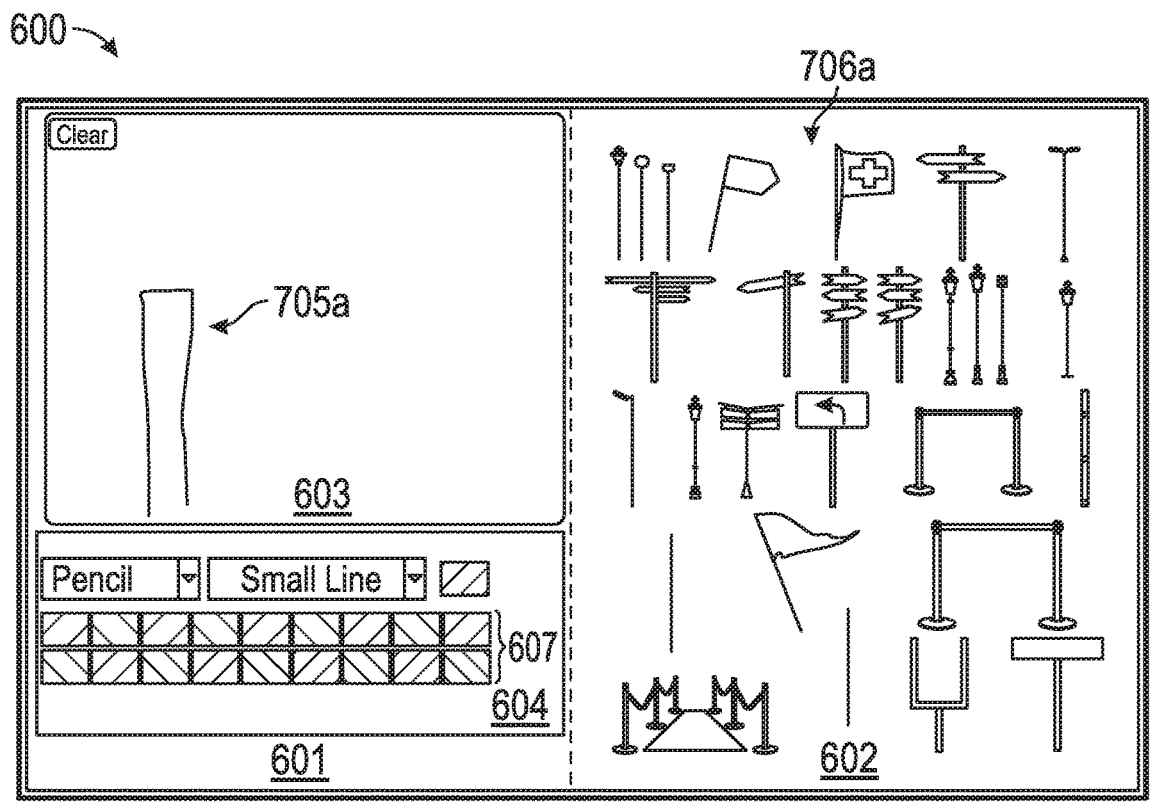
FIGS. 7A-7D illustrates examples of a user drawing based image search of a second concept using the user interface of FIG. 6A according to certain aspects of the subject technology.
Figure 7B:
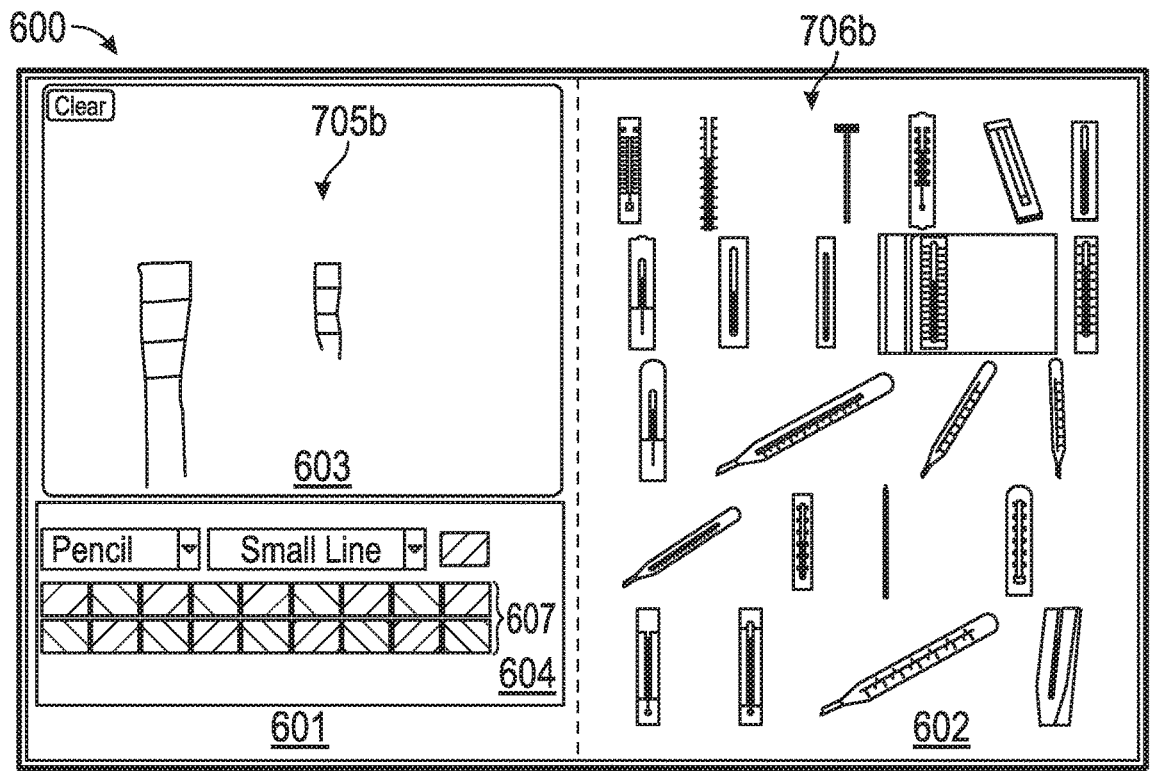
Figure 7C:
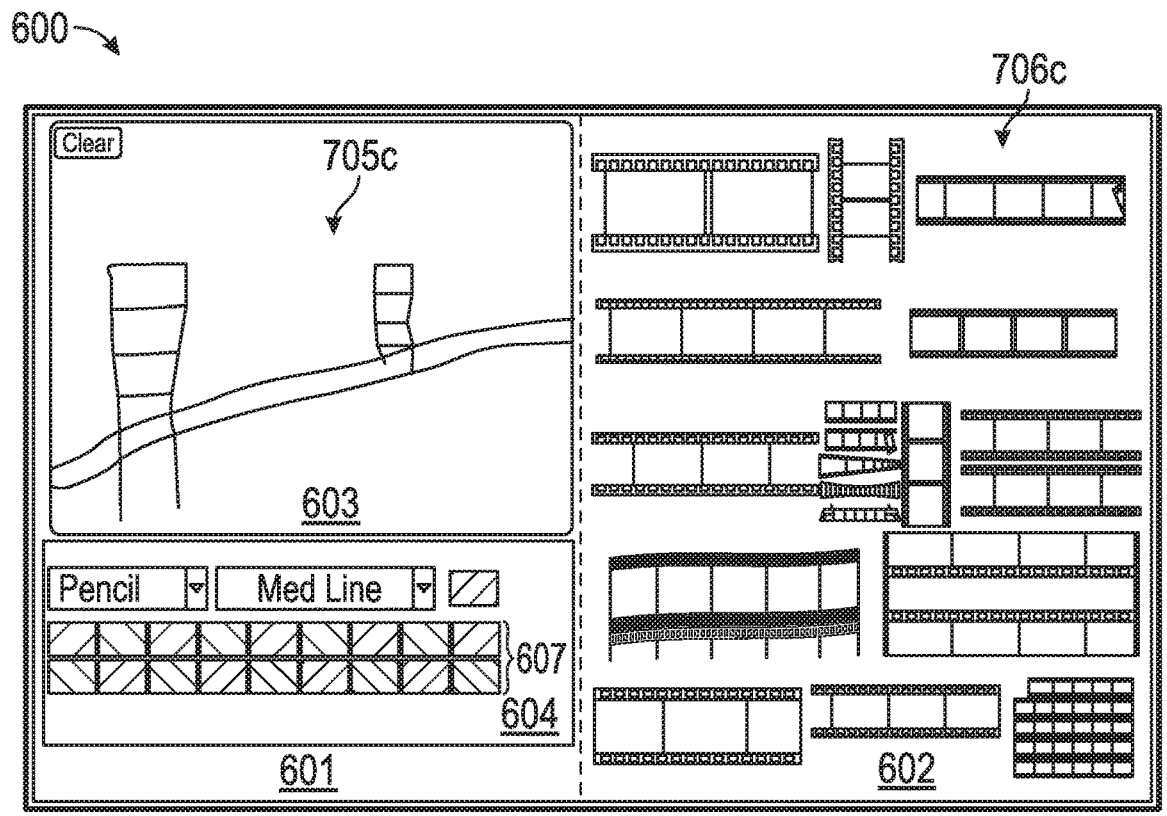
Figure 7D:
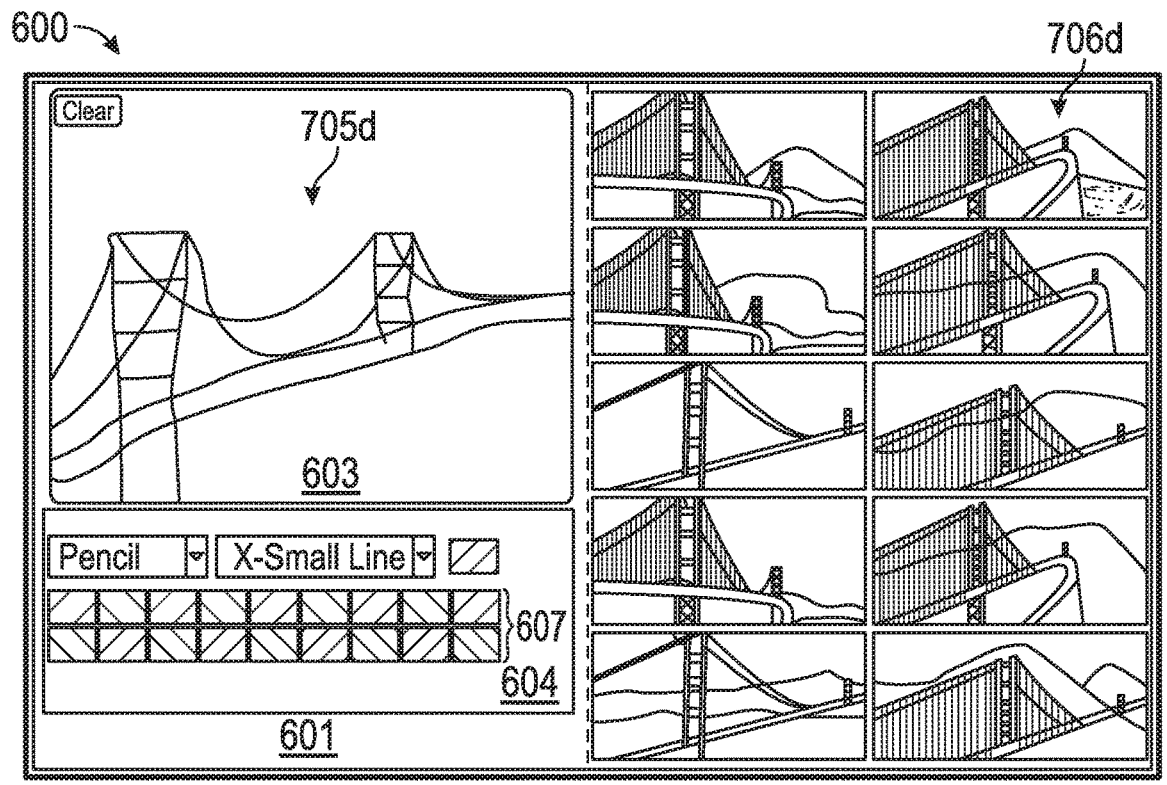

FIGS. 7A-7D example illustrations of a prioritizing a set of images identified as responsive to a user drawing based image search query according to certain aspects of the subject technology. Specifically, FIG. 7A provides an example illustration of a prioritization for a listing of images 706*a* displayed in the user interface 600 responsive to a first image search query. The first image search query includes a first user drawing 705*a* identifying a first shape having red-colored lines. In this example, the convolutional neural network 234 identifies multiple candidate semantic concepts based on the first shape. As such, the listing of images 706*a* includes images identifying a wide array of possible objects respectively representing the candidate semantic concepts. FIG. 7B provides an example illustration of a prioritization for a listing of images 706*b* displayed in the user interface 600 responsive to a second image search query. The second image search query includes a second user drawing 705*b* identifying a second shape having red-colored lines including additional lines to the first shape. In this example, the convolutional neural network 234 identifies the two red-colored shapes as a "thermometer" semantic concept. Hence, the listing of images 706*b* includes images identifying thermometers. FIG. 7C provides an example illustration of a prioritization for a listing of images 706*c* displayed in the user interface 600 responsive to a third image search query. The third image search query includes a third user drawing 705*c* identifying an additional red line with a wider thickness intersecting the two shapes. In this example, the convolutional neural network 234 identifies the two red-colored shapes with the additional line as a "film roll" semantic concept. Hence, the listing of images 706*b* includes images identifying different versions of film roll. FIG. 7D provides an example illustration of a prioritization for a listing of images 706*d* displayed in the user interface 600 responsive to a fourth image search query. The fourth image search query includes a fourth user drawing 705*d* identifying two additional red-colored curved lines intersecting the two original shapes to form a final user drawing. In this example, the convolutional neural network 234 identifies the combination of shapes as a "bridge," in particular, the semantic concept identified is "The Golden Gate Bridge." Hence, the listing of images 706*d* includes images identifying different versions of the Golden Gate Bridge.

Figure 8A:
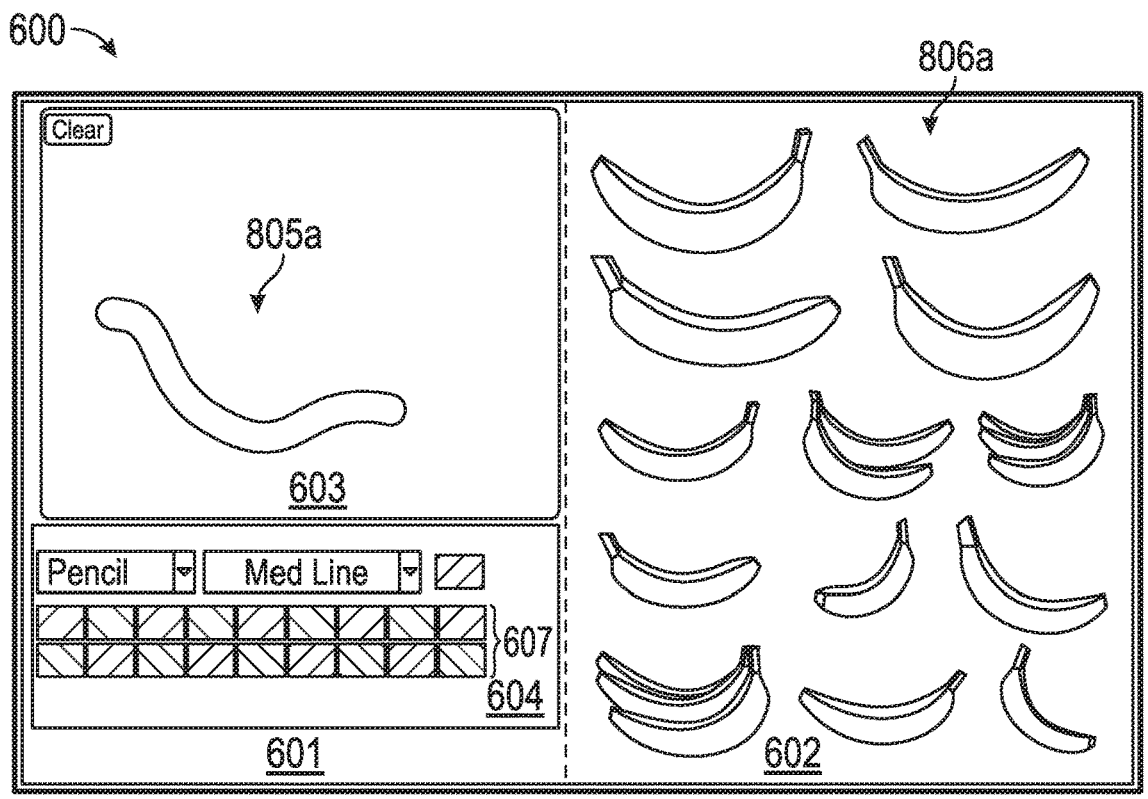
FIGS. 8A-8D illustrates examples of a user drawing based image search of a third concept using the user interface of FIG. 6A according to certain aspects of the subject technology.
Figure 8B:
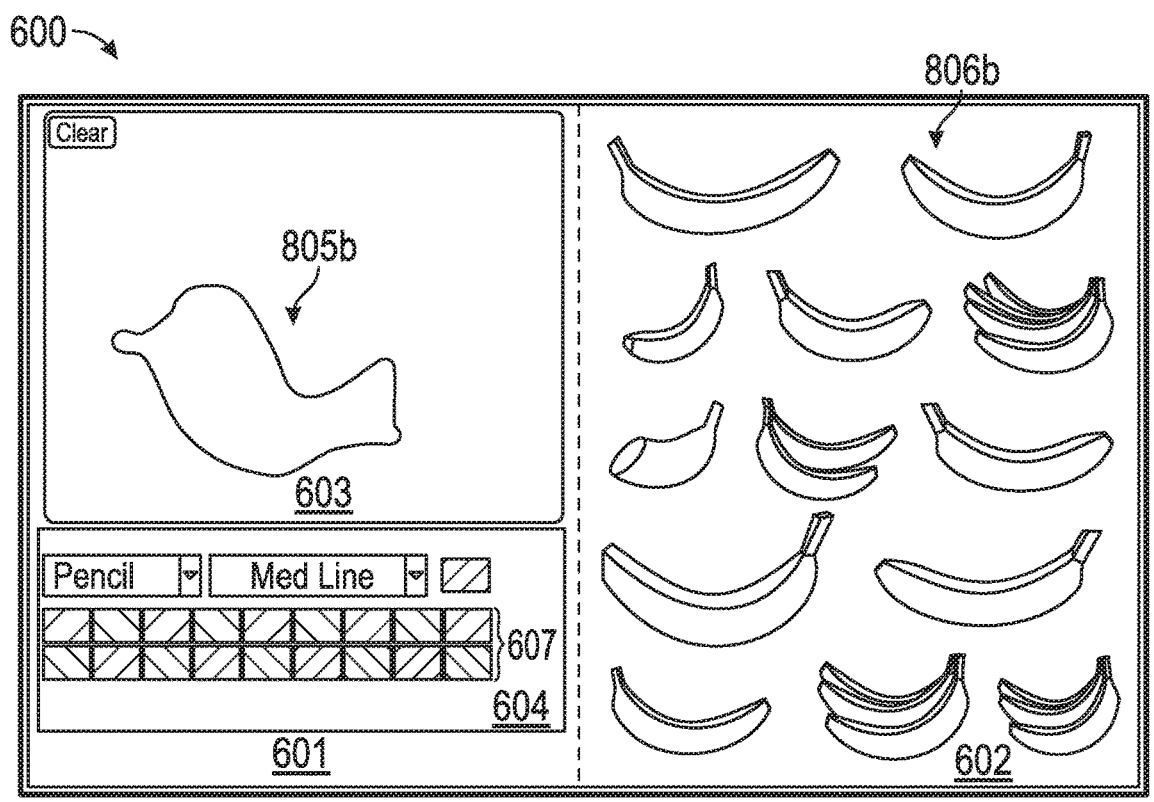
Figure 8C:
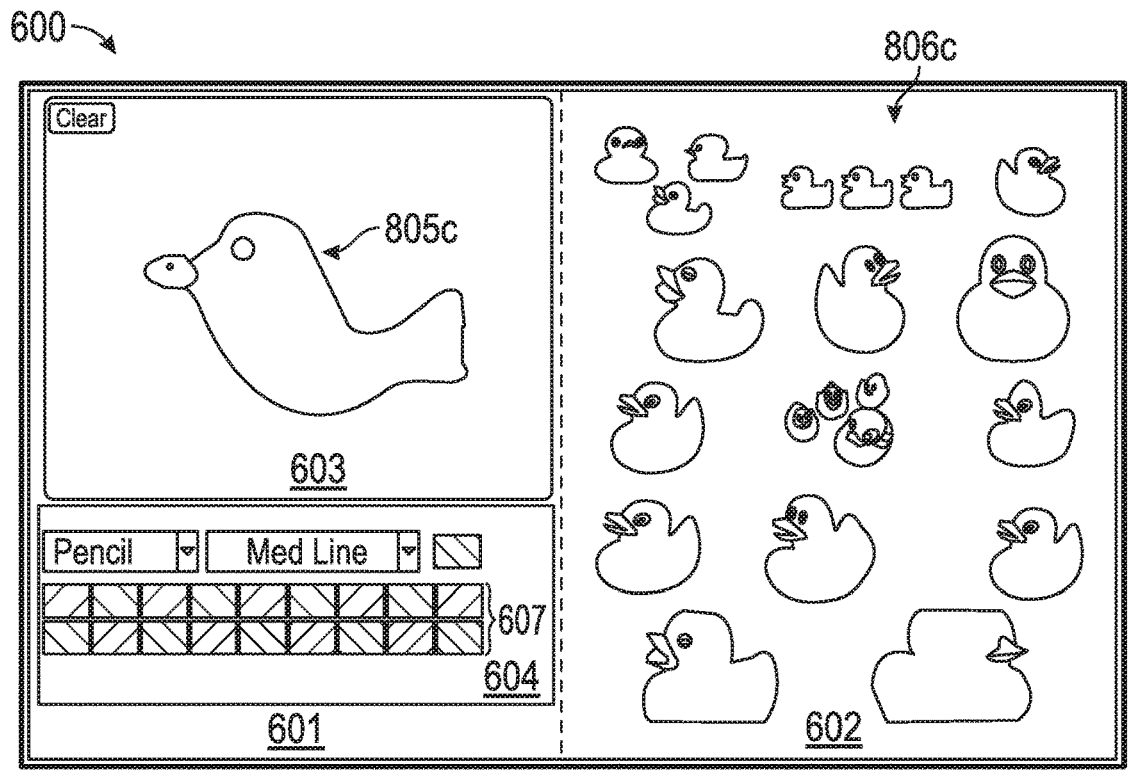
Figure 8D:
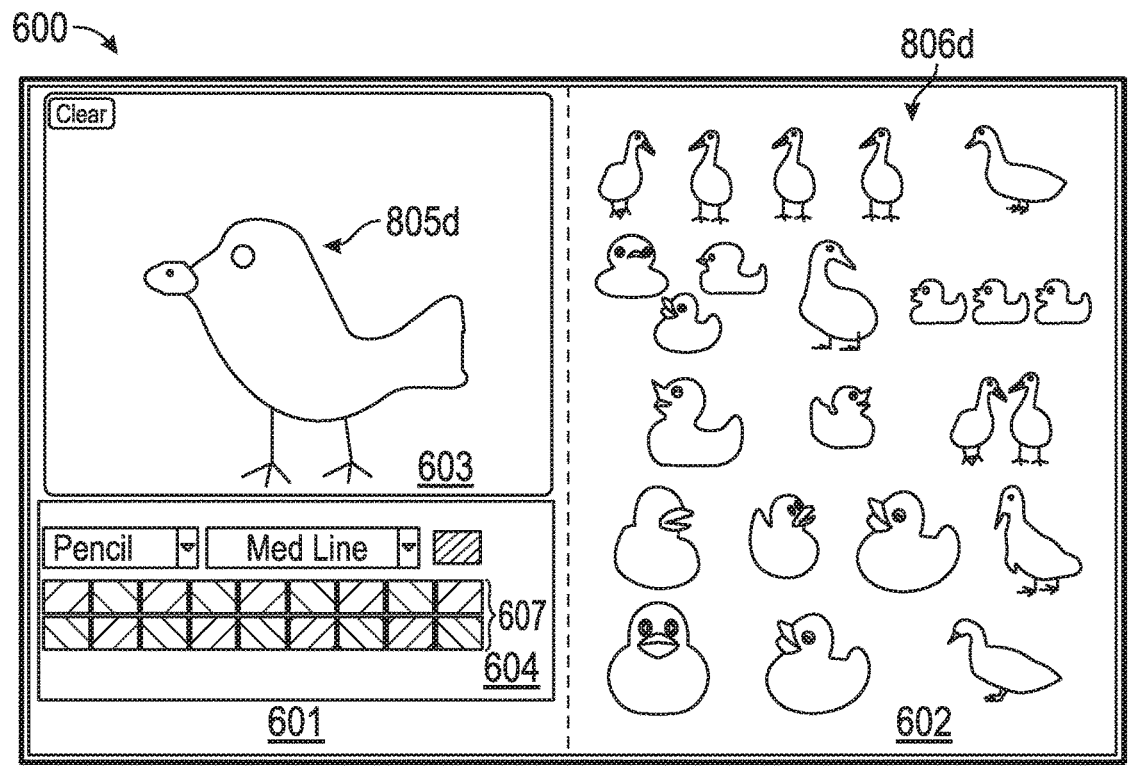

FIGS. 8A-8D example illustrations of a prioritizing a set of images identified as responsive to a user drawing based image search query according to certain aspects of the subject technology. Specifically, FIG. 8A provides an example illustration of a prioritization for a listing of images 806*a* displayed in the user interface 600 responsive to a first image search query. The first image search query includes a first user drawing 805*a* identifying a first shape having a curved yellow-colored line. In this example, the convolutional neural network 234 identifies the first shape as a "banana" semantic concept. As such, the listing of images 806*a* includes images of bananas. FIG. 8B provides an example illustration of a prioritization for a listing of images 806*b* displayed in the user interface 600 responsive to a second image search query. The second image search query includes a second user drawing 805*b* identifying adjustments to the first shape by widening the overall shape and adding additional curved features. In this example, the convolutional neural network 234 also identifies the adjusted shape as a "banana" semantic concept. Hence, the listing of images 806*b* includes images identifying bananas, however, certain images may vary from the listing of images 806*a* based on a vector distance between the candidate images and the user drawing 805*b*. FIG. 8C provides an example illustration of a prioritization for a listing of images 806c displayed in the user interface 600 responsive to a third image search query. The third image search query includes a third user drawing 805c identifying two additional features (e.g., black dot and orange tip). In this example, the convolutional neural network 234 identifies the yellow shape with the additional two features as a "toy duck" semantic concept. Hence, the listing of images 806c includes images identifying different versions of a yellow toy duck. FIG. 8D provides an example illustration of a prioritization for a listing of images 806d displayed in the user interface 600 responsive to a fourth image search query. The fourth image search query includes a fourth user drawing 805d identifying the addition of two features representing two duck legs to form a final user drawing. In this example, the convolutional neural network 234 also identifies the new object in FIG. 8D as a "toy duck." In addition, the convolutional neural network 234 may identify a secondary semantic concept such as a "natural duck." Hence, the listing of images 806d includes images identifying different versions of a natural duck and toy duck.

Figure 9:
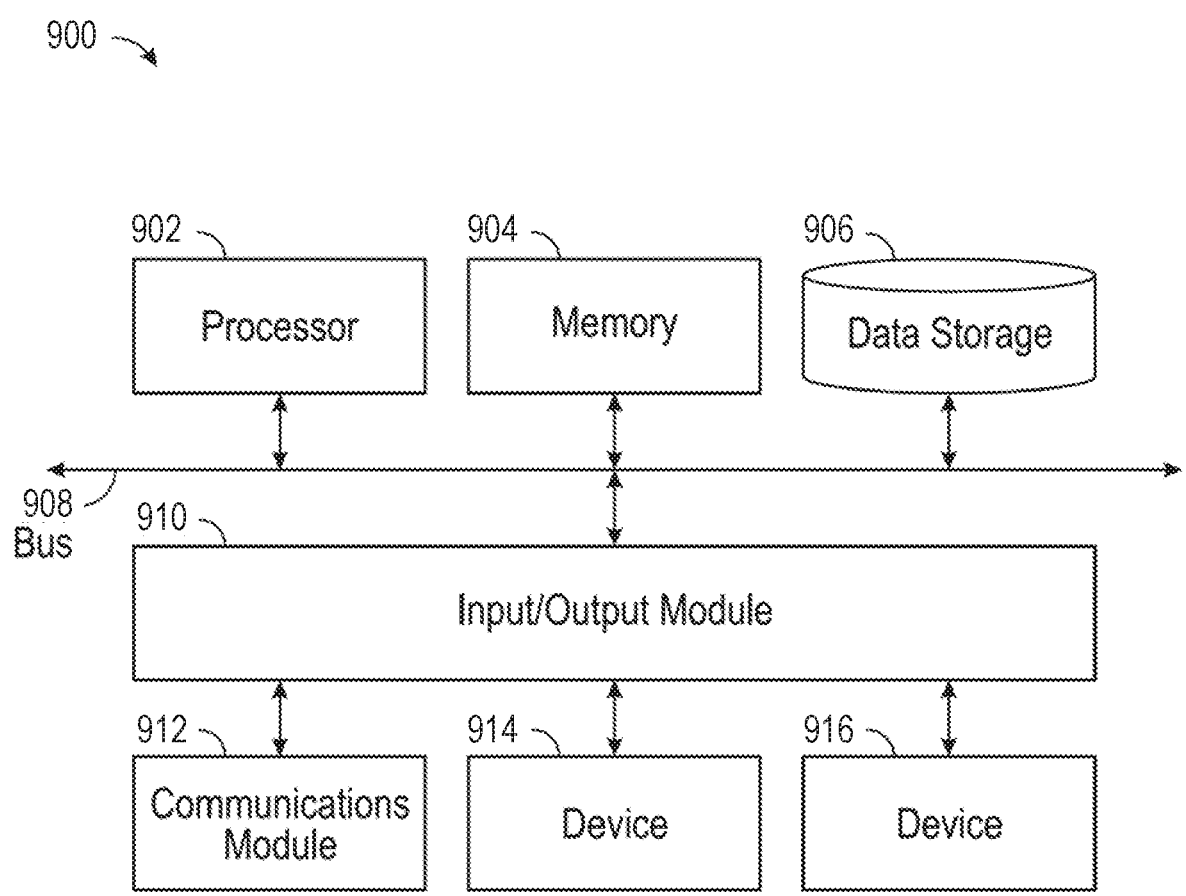
FIG. 9 is a block diagram illustrating an example computer system with which the client and server of FIG. 2 can be implemented.

FIG. 9 is a block diagram illustrating an exemplary computer system 900 with which the client 110 and server 130 of FIG. 1 can be implemented. In certain aspects, the computer system 900 may be implemented using hardware or a combination of software and hardware, either in a dedicated server, or integrated into another entity, or distributed across multiple entities.

Computer system 900 (e.g., client 110 and server 130) includes a bus 908 or other communication mechanism for communicating information, and a processor 902 (e.g., processor 212 and 236) coupled with bus 908 for processing information. By way of example, the computer system 900 may be implemented with one or more processors 902. Processor 902 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 900 can include, in addition to hardware, code that creates an execution environment for the computer program in question, e.g., code that constitutes processor firmware, a protocol stack, a database management system, an operating system, or a combination of one or more of them stored in an included memory 904 (e.g., memory 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 908 for storing information and instructions to be executed by processor 902. The processor 902 and the memory 904 can be supplemented by, or incorporated in, special purpose logic circuitry.

The instructions may be stored in the memory 904 and implemented in one or more computer program products, i.e., one or more modules of computer program instructions encoded on a computer readable medium for execution by, or to control the operation of, the computer system 900, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 904 may also be used for storing temporary variable or other intermediate information during execution of instructions to be executed by processor 902.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 900 further includes a data storage device 906 such as a magnetic disk or optical disk, coupled to bus 908 for storing information and instructions. Computer system 900 may be coupled via input/output module 910 to various devices. The input/output module 910 can be any input/output module. Exemplary input/output modules 910 include data ports such as USB ports. The input/output module 910 is configured to connect to a communications module 912. Exemplary communications modules 912 (e.g., communications modules 218 and 238) include networking interface cards, such as Ethernet cards and modems. In certain aspects, the input/output module 910 is configured to connect to a plurality of devices, such as an input device 914 (e.g., input device 216) and/or an output device 916 (e.g., output device 214). Exemplary input devices 914 include a keyboard and a pointing device, e.g., a mouse or a trackball, by which a user can provide input to the computer system 900. Other kinds of input devices 914 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 916 include display devices, such as a CRT (cathode ray tube) or LCD (liquid crystal display) monitor, for displaying information to the user.

According to one aspect of the present disclosure, the client 110 and server 130 can be implemented using a computer system 900 in response to processor 902 executing one or more sequences of one or more instructions contained in memory 904. Such instructions may be read into memory 904 from another machine-readable medium, such as data storage device 906. Execution of the sequences of instructions contained in main memory 904 causes processor 902 to perform the process steps described herein. One or more processors in a multi-processing arrangement may also be employed to execute the sequences of instructions contained in memory 904. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 900 can include clients and servers. A client and server are generally remote from each other and typically interact through a communication network. The relationship of client and server arises by virtue of computer programs running on the respective computers and having a client-server relationship to each other. Computer system 900 can be, for example, and without limitation, a desktop computer, laptop computer, or tablet computer. Computer system 900 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer readable medium" as used herein refers to any medium or media that participates in providing instructions to processor 902 for execution. Such a medium may take many forms, including, but not limited to, non-volatile media, volatile media, and transmission media. Non-volatile media include, for example, optical or magnetic disks, such as data storage device 906. Volatile media include dynamic memory, such as memory 904. Transmission media include coaxial cables, copper wire, and fiber optics, including the wires that comprise bus 908. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the term "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method, comprising:
generating a library of training drawings;
extracting visual feature descriptors of each training drawing in the library of training drawings;
mapping the visual feature descriptors of each training drawing to a training vector;
associating a concept of a plurality of predetermined concepts to each training vector;
receiving a first user input identifying a representation of a user drawing, the user drawing representing a search query for initiating an image search;
determining a concept of the user drawing, the concept of the user drawing indicating a semantic subject matter in the representation of the user drawing;
determining a collection of images is relevant to the concept of the user drawing;
determining a subset of the collection of images associated with the concept of the user drawing;
mapping the concept of the user drawing to a cluster of training drawings having a cluster identifier that matches the semantic subject matter,
wherein the cluster identifier is a semantic concept corresponding to the cluster of training drawings,
wherein the subset of the collection of images includes an image data from the cluster of training drawings, and
wherein the image data is indicative of how users draw semantic concepts;
comparing, in response to the determination that the subset is associated with the concept of the user drawing, feature vectors of images in the subset of the collection of images to a feature vector of the user drawing;
storing, in a memory associated with the library of training drawings and prior to receiving a second user input of the user drawing, the visual feature descriptor of the representation of the user drawing for offline training in determining a subsequent concept of the user drawing that combines the first user input and the second user input,
wherein the offline training is performed prior to receiving the second user input, and
wherein the second user input is an extension of the user drawing and is received subsequently to the first user input; and
generating search results associated with the image search based on comparison results of the comparison between the feature vector of the user drawing and a feature vector of an image in the subset of the collection of images.

2. The computer-implemented method of claim 1, wherein receiving the first user input comprises:
detecting a first sequence of user inputs identifying a first portion of the user drawing, the first sequence of user inputs comprising a plurality of pixel coordinates corresponding to a two-dimensional representation of a first drawing stroke.

3. The computer-implemented method of claim 2, wherein the concept is determined in response to the detection of the first sequence of user inputs.

4. The computer-implemented method of claim 2, further comprising:

detecting a second sequence of user inputs identifying a second portion of the user drawing, the second sequence of user inputs being detected subsequent to the first sequence of user inputs, the second sequence of user inputs comprising a second plurality of pixel coordinates corresponding to a two-dimensional representation of a second drawing stroke.

5. The computer-implemented method of claim 4, wherein the concept determined based on the first sequence of user inputs is changed to a new concept in response to the detection of the second sequence of user inputs.

6. The computer-implemented method of claim 4, wherein the concept is determined based on a combination of the first sequence of user inputs and the second sequence of user inputs.

7. The computer-implemented method of claim 1, wherein determining the concept of the user drawing comprises:
comparing the representation of the user drawing to a plurality of training drawings, each of the plurality of training drawings being associated with a concept of the plurality of predetermined concepts.

8. The computer-implemented method of claim 1, wherein comparing the feature vectors of the images in the subset of the collection of images to the feature vector of the user drawing comprises:
determining a vector distance between the feature vector of the user drawing and each of the feature vectors of the images; and
selecting a feature vector of an image that corresponds to a smallest vector distance.

9. The computer-implemented method of claim 8, wherein generating the search results comprises:
obtaining images from the collection of images which correspond to a feature vector of an image in the subset of the collection of images; and
providing the images for display to a user of a client device.

10. A system comprising:
one or more processors;
a non-transitory computer-readable storage medium coupled to the one or more processors, the non-transitory computer-readable storage medium including instructions that, when executed by the one or more processors, cause the one or more processors to:
generate a library of training drawings;
map a concept of each training drawing to a training vector;
associate a concept of a plurality of predetermined concepts to each training vector;
detect a first input query identifying a representation of a first user drawing;
initiate, in response to detecting the first input query, a first search for images relevant to a concept associated with the first user drawing, wherein the first search includes:
(i) determining a subset of a collection of images is associated with the concept associated with the first user drawing,
(ii) mapping the concept associated with the first user drawing to a cluster of training drawings having a cluster identifier that matches a concept associated with a first user drawing,
wherein the cluster identifier is a semantic concept corresponding to the cluster of training drawings, wherein the subset of the collection of images includes an image data from the cluster of training drawings, and wherein the image data is indicative of how users draw semantic concepts, (iii) comparing, in response to the determination that the subset is associated with the concept associated with the first user drawing, a feature vector of multiple images in the subset of the collection of images to a feature vector of the first user drawing, and (iv) storing, in a memory associated with the library of training drawings and prior to receiving a second input query of the first user drawing, the concept associated with the first user drawing for offline training in determining a subsequent concept associated with the first user drawing that combines the first input query and the second input query, wherein the offline training is performed prior to receiving the second input query, and wherein the second input query is received subsequently to the first input query;

generate first search results associated with the first search;

provide, for display, the first search results;

detect the second input query identifying a representation of the first user drawing as a combination of the first input query and the second input query, the second input query being detected subsequent to the first input query;

initiate, in response to detecting the second input query, a second search for images relevant to the subsequent concept associated with the first user drawing as the combination of the first input query and the second input query;

generate second search results associated with the second search; and provide, for display, the second search results, the second search results being different than the first search results if a subsequent concept associated with a second user drawing as the combination of the first input query and the second input query is different than the concept associated with the first user drawing.

11. The system of claim 10, wherein the instructions further cause the one or more processors to:

detect a touch input on a display screen of a client device as part of detecting the first input query or detecting the second input query, the touch input being detected based on an object associated with a user of the client device making contact with the display screen at an input section of a user interface of the client device; and detect removal of the touch input from the display screen, the first search or the second search being initiated in response to detecting the removal of the touch input.

12. The system of claim 10, wherein the instructions further cause the one or more processors to:

detect a touch input on a display screen of a client device as part of detecting the first input query or detecting the second input query, the touch input being detected based on an object associated with a user of the client device making contact with the display screen at an input section of a user interface of the client device; and detect a pause in the touch input on the display screen, the first search or the second search being initiated in response to detecting the pause in the touch input.

13. The system of claim 10, wherein the second user drawing is an extension of the first user drawing to form a final user drawing comprising the first user drawing and the second user drawing.

14. The system of claim 10, wherein the library of training drawings is generated prior to the first input query being detected.

15. The system of claim 14, wherein the instructions further cause the one or more processors to:

generate a probability distribution of the plurality of predetermined concepts, the probability distribution indicating a likelihood for each concept of the plurality of predetermined concepts that the concept corresponds to the first user drawing; and select one or more concepts having a likelihood greater than a predetermined threshold, the one or more concepts being applied to the first search or the second search.

16. The system of claim 10, wherein the instructions further cause the one or more processors to:

extract feature descriptors of the first user drawing;

map the feature descriptors of the first user drawing to a feature vector, the feature vector corresponding to the concept associated with the first user drawing;

obtain images associated with a concept that matches the concept associated with the first user drawing;

compute a vector distance between the feature vector of the first user drawing to feature vectors of the images;

select one or more images that correspond to a smallest vector distance; and rank the one or more images based on the vector distances of the images.

17. A non-transitory computer readable storage medium coupled to a processor, the non-transitory computer readable storage medium including instructions that, when executed by the processor, cause the processor to:

provide a user interface for display via an application of a client device;

generate a library of training drawings;

map a concept of each training drawing to a training vector;

associate a concept of a plurality of predetermined concepts to each training vector;

detect a first input query in an input section of the user interface, the first input query identifying a representation of a first user drawing, the first user drawing representing at least a portion of a target input drawing;

determine, in response to detecting the first input query, whether the target input drawing represents a first concept using a probability distribution of concepts;

initiate a first search for images relevant to the first concept if the target input drawing is determined to represent the first concept;

determine a collection of images is relevant to the first concept;

determine a subset of the collection of images is associated with the first concept;

map the first concept to a cluster of training drawings having a cluster identifier that matches the first concept, wherein the cluster identifier is a semantic concept corresponding to the cluster of training drawings, wherein the subset of the collection of images includes an image data from the cluster of training drawings, and wherein the image data is indicative of how users draw semantic concepts;

compare, in response to a determination that the subset is associated with the first concept, a feature vector of multiple images in the subset of the collection of images to a feature vector of the target input drawing;

store, in a memory associated with the library of training drawings and prior to receiving a second input query of the first user drawing, a concept of the target input drawing for offline training in determining a second concept of the first user drawing that combines the first input query and the second input query, wherein the offline training is performed prior to receiving the second input query, and wherein the second input query is received subsequently to the first input query;

generate first search results associated with the first search using the first user drawing as the target input drawing, wherein the first search results are generated based on comparison results of the comparison between the feature vector of the target input drawing and a feature vector of an image in the subset of the collection of images;

provide, for display, the first search results in an output section of the user interface;

detect the second input query in the input section, the second input query identifying a representation of the first user drawing as a combination of the first input query and the second input query, the second input query being detected subsequent to the first input query;

determine, in response to detecting the second input query, whether a second user drawing as a combination of the first input query and the second input query modifies the target input drawing from the first concept to the second concept using the probability distribution of concepts;

initiate a second search for images relevant to the second concept if the second user drawing is determined to modify the target input drawing to the second concept, otherwise the second search is initiated to search for images relevant to the first concept;

generate second search results associated with the second search using the second user drawing as the target input drawing; and provide, for display, the second search results in the output section.

18. The non-transitory computer readable storage medium of claim 17, wherein the instructions further cause the processor to:

generate, in response to receiving the target input drawing, the probability distribution of concepts using user information indicating trends on how users draw each concept of the plurality of predetermined concepts, the probability distribution of concepts indicating different likelihood values for each concept based on the target input drawing.

* * * * *